US010787543B2

(12) United States Patent
Taniguchi et al.

(10) Patent No.: US 10,787,543 B2
(45) Date of Patent: Sep. 29, 2020

(54) POLYETHER POLYOL, METHOD FOR PRODUCING POLYETHER POLYOL, POLYESTER ELASTOMER AND POLYURETHANE

(71) Applicant: Mitsubishi Chemical Corporation, Chiyoda-ku (JP)

(72) Inventors: Takanori Taniguchi, Mie (JP); Yoko Nakagawa, Mie (JP); Ryo Yamashita, Mie (JP); Nobuyuki Kobayashi, Mie (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 257 days.

(21) Appl. No.: 15/598,803

(22) Filed: May 18, 2017

(65) Prior Publication Data
US 2017/0253698 A1  Sep. 7, 2017

Related U.S. Application Data

(63) Continuation of application No. PCT/JP2015/082608, filed on Nov. 19, 2015.

(30) Foreign Application Priority Data

Nov. 20, 2014 (JP) ................. 2014-235853
Apr. 15, 2015 (JP) ................. 2015-083504
Apr. 28, 2015 (JP) ................. 2015-092098
Aug. 3, 2015 (JP) ................. 2015-153410

(51) Int. Cl.
C08G 65/34 (2006.01)
C09D 175/08 (2006.01)
C08G 18/48 (2006.01)
D01F 6/70 (2006.01)
C08G 63/688 (2006.01)
C08G 65/30 (2006.01)
C08G 65/20 (2006.01)
C08G 63/16 (2006.01)
C08G 65/46 (2006.01)
D06N 3/00 (2006.01)

(52) U.S. Cl.
CPC .......... *C08G 65/34* (2013.01); *C08G 18/48* (2013.01); *C08G 63/16* (2013.01); *C08G 63/688* (2013.01); *C08G 65/20* (2013.01); *C08G 65/30* (2013.01); *C08G 65/46* (2013.01); *C09D 175/08* (2013.01); *D01F 6/70* (2013.01); *D06N 3/0027* (2013.01); *D06N 2201/0281* (2013.01); *D06N 2209/1635* (2013.01); *D06N 2211/10* (2013.01); *D10B 2401/061* (2013.01); *D10B 2501/00* (2013.01)

(58) Field of Classification Search
CPC ........ C08G 65/34; C08G 63/16; C08G 65/46; C08G 63/688; C08G 18/48; C08G 65/30; C08G 65/20; D06N 3/0027; D06N 2211/10; D06N 2209/1635; D06N 2201/0281; D01F 6/70; C09D 175/08; D10B 2501/00; D10B 2401/061
See application file for complete search history.

(56) References Cited

U.S. PATENT DOCUMENTS

| | | | |
|---|---|---|---|
| 3,478,109 A | 11/1969 | McConnell et al. | |
| 3,925,484 A * | 12/1975 | Baker | C08G 65/30 549/509 |
| 4,762,951 A | 8/1988 | Mueller | |
| 4,933,503 A | 6/1990 | Mueller | |
| 5,097,077 A | 3/1992 | Mueller et al. | |
| 5,585,458 A * | 12/1996 | Lin | C08G 65/3312 528/417 |
| 6,194,503 B1 | 2/2001 | Müller | |
| 6,777,524 B1 * | 8/2004 | Shimizu | C08G 18/10 528/59 |
| 6,833,428 B1 * | 12/2004 | Kato | C08G 63/672 528/272 |
| 2004/0132962 A1 | 7/2004 | Okabe et al. | |
| 2007/0191567 A1 | 8/2007 | Tsuge et al. | |
| 2015/0166497 A1 * | 6/2015 | Dorai | C08G 65/30 549/509 |

FOREIGN PATENT DOCUMENTS

| | | |
|---|---|---|
| CN | 1510067 A | 7/2004 |
| EP | 0 961 802 A1 | 12/1999 |
| EP | 1 433 807 A1 | 6/2004 |
| JP | 59-221326 A | 12/1984 |

(Continued)

OTHER PUBLICATIONS

Extended European Search Report dated Oct. 6, 2018 in Patent Application No. 15861679.7.
International Search Report dated Feb. 2, 2016 in PCT/JP2015/082608 (with English translation).
Katsuji Matsunaga, "Fundamentals and Applications in Polyurethane" CMC Publishing Co., Ltd., Nov. 2006, pp. 96-106 and cover pages.
Taiwanese Office Action and Search Report dated Mar. 28, 2019 in Patent Application No. 104138550, 11 pages (with English translation).
Japanese Office Action dated Jul. 9, 2019, in Patent Application No. 2015-227675, 19 pages (with unedited computer generated English translation).

(Continued)

*Primary Examiner* — Rabon A Sergent
(74) *Attorney, Agent, or Firm* — Oblon, McClelland, Maier & Neustadt, L.L.P.

(57) ABSTRACT

The present invention provides a high-molecular-weight polyether polyol ensuring that when used as a polyurethane raw material, a polyurethane having excellent flexibility and elastic recovery can be obtained; and a method for producing, with high productivity, a polyether polyol having a higher number average molecular weight and a narrower molecular weight distribution than those of the raw material polyether polyol, and the polyether polyol of the present invention has a number average molecular weight of 3,500 to 5,500 and a molecular weight distribution of 1.7 to 3.0.

16 Claims, No Drawings

(56) References Cited

FOREIGN PATENT DOCUMENTS

| | | |
|---|---|---|
| JP | 60-42421 A | 3/1985 |
| JP | 60-108424 A | 6/1985 |
| JP | 62-220520 A | 9/1987 |
| JP | 1-92221 A | 4/1989 |
| JP | 3-126722 A | 5/1991 |
| JP | 4-255712 A | 9/1992 |
| JP | 6-220151 A | 8/1994 |
| JP | 8-502531 A | 3/1996 |
| JP | 2001-502011 A | 2/2001 |
| JP | 2002-80553 A | 3/2002 |
| JP | 2004-43626 A | 2/2004 |
| JP | 2004-161893 A | 6/2004 |
| JP | 2004-211086 A | 7/2004 |
| JP | 2005-36047 A | 2/2005 |
| JP | 2005-179567 A | 7/2005 |
| JP | 2007-69110 A | 3/2007 |
| JP | 2007-186545 A | 7/2007 |
| JP | 2008-63391 A | 3/2008 |
| JP | 2010-174053 A | 8/2010 |
| JP | 2011-46912 A | 3/2011 |
| JP | 2011-102365 A | 5/2011 |
| JP | 2014-47222 A | 3/2014 |
| WO | WO 98/37121 A | 8/1998 |
| WO | WO 2006/043569 A1 | 4/2006 |

OTHER PUBLICATIONS

Taiwanese Office Action dated Sep. 27, 2019, in Patent Application No. 104138550, 8 pages (with English translation).
Japanese Office Action dated Feb. 4, 2020, in Patent Application No. 2015-227675, 10 pages (with unedited computer generated English translation).

* cited by examiner

POLYETHER POLYOL, METHOD FOR PRODUCING POLYETHER POLYOL, POLYESTER ELASTOMER AND POLYURETHANE

CROSS-REFERENCE TO RELATED APPLICATIONS

This application is a Continuation of PCT/JP2015/082508, which was filed on Nov. 19, 2015. This application is based upon and claims the benefit of priority to Japanese Application No. 2015-153410, which was filed on Aug. 3, 2015, and to Japanese Application No. 2015-092098, which was filed on Apr. 28, 2015, and to Japanese Application No. 2015-083504, which was filed on Apr. 15, 2015, and to Japanese Application No. 2014-235853, which was filed on Nov. 20, 2014, the contents of which are incorporated herein by reference.

TECHNICAL FIELD

The present invention relates to a polyether polyol, a production method of a polyether polyol, a polyester elastomer, and a polyurethane. More specifically, the present invention relates to a polyether polyol suitable as a polyurethane raw material being excellent in the flexibility and elastic recovery and providing good productivity, a method for producing a polyether polyol having a higher number average molecular weight and a narrower molecular weight distribution than those of the raw material polyether polyol, and a polyester elastomer and a polyurethane each being excellent in the flexibility and elastic recovery and providing good productivity.

BACKGROUND ART

A polyether polyol is used as a raw material of polyurethanes or polyester elastomers in various fields.

A polyether polyol is a linear polyether polyol having a primary hydroxyl group at both ends, represented by the formula: HO—[(CH$_2$)$_n$O]$_m$—H (m represents an integer of 2 or more, and n represents an integer of 1 or more), and is generally produced by ring-opening polymerization of a cyclic ether. Among others, a polytetramethylene ether glycol (hereinafter, sometimes simply referred to as "PTMG") obtained by a ring-opening polymerization reaction of tetrahydrofuran (hereinafter, sometimes simply referred to as "THF") is a linear polyether glycol having a hydroxyl group at both ends and is represented by the formula: HO—[(CH$_2$)$_4$ O]$_n$—H (n represents an integer of 2 or more). PTMG is very useful as a raw material of urethane-based resins or elastic fibers requiring stretchability or elasticity.

Recently, in the fields of elastic fiber, synthetic leather•artificial leather, etc. using polyurethane as a raw material, demand for a material excellent in flexibility and elastic recovery is increasing. In particular, a polyether polyol contained as a soft segment in polyurethane is responsible for contributing to flexibility or elastic recovery of the polyurethane. Accordingly, various physical properties of the produced polyurethane can be adjusted by controlling the kind, molecular weight and molecular weight distribution of the polyether polyol.

In order to produce the target polyether polyol, a large number of methods for controlling the molecular weight or molecular weight distribution of a polyether polyol by using various refining techniques such as extraction or membrane separation have been heretofore reported.

Patent Document 1 states that when a mixed solution composed of raw material PTMG methanol and water is left standing and thereby separated into two layers of water layer and oil layer, PTMG having a high molecular weight is obtained from the target layer.

In addition, Patent Document 1 states, at from page (3), left upper column, line 18 to the same page, right upper column, line 2, that "The method is preferably performed at 30° C. or less so as to separate a low-molecular-weight form with good selectivity. At about 15° C. or less, PTMG may precipitate as a solid, but in the case of wishing to recover a lot of PTMG, a lower temperature is preferred".

Patent Document 2 states that when a mixed solution composed of an alcohol, a hydrocarbon compound, raw material PTMG and water is left standing and thereby separated into three layers of hydrocarbon layer, alcohol layer and water layer, PTMG having a higher molecular weight than that of the raw material is obtained from the alcohol layer.

A cyclic oligomer occurring as a byproduct in the course of producing PTMG may be separated by use of hydrocarbon, but there is a problem such as increase in the cost due to use of a hydrocarbon compound or an increase in the cost for removing the hydrocarbon compound from product PTMG.

Each of Patent Documents 3 to 5 states that when a mixed solution containing raw material PTMG, water and various solvents is left standing to cause layer separation, PTMG having a high molecular weight is obtained from the target layer.

However, in Patent Documents 1 to 5, it is only demonstrated that layer separation was performed using raw material PTMG having a number average molecular weight of 1,000 to 2,000, and there was a problem that a polyether polyol having an adequate number average molecular weight and a narrow molecular weight distribution cannot be produced with high productivity from the raw material polyether polyol.

On the other hand, the polyurethane is classified, by the type of raw material polyol constituting the soft segment moiety, into a polyether type typified by polypropylene glycol and polytetramethylene ether glycol (PTMG), a polyester polyol type typified by a dicarboxylic acid-based polyester, a polylactone type typified by polycaprolactone, and a polycarbonate type obtained by reacting a carbonate source and a diol (Non-Patent Document 1).

Among others, a polyurethane using PTMG as a soft segment moiety is excellent in the abrasion resistance, hydrolysis resistance and elastic recovery and is being used for various applications, including elastic fiber and synthetic leather•artificial leather (the synthetic leather•artificial leather as used in the present invention is in conformity with the regulations of the Household Goods Quality Labeling Law).

A polyurethane elastic fiber using polyurethane as a raw material is being widely used, for example, in the sports field typified by swimming wear, tights, etc.; in the clothing field such as innerwear, outerwear and stocking; in the hygiene products field typified by a disposable diaper; and in the industrial materials field.

Recently, at the time of using a polyurethane elastic fiber in such a clothing filed, "ease of wearing" and "freedom of movement" are increasingly required of clothing.

As the means for evaluating the "ease of wearing" and "freedom of movement", a tensile test or elastic recovery test using a film or yarn as the specimen is often employed.

In the tensile test of the specimen, the specimen is required to exhibit a high initial modulus, a large breaking elongation, and a breaking strength above a certain level. Clothing having such properties allows for wearing with a slight force, stretches a lot, has strength, and therefore, can be said to be "easy-to-wear" clothing.

In the elastic recovery test of the specimen, the specimen is required to exhibit a small strength difference (low hysteresis loss) at stretching and a reduced residual strain. Clothing having such properties can be said to be clothing not only stress-free and easy-to-wear by allowing for easy dressing/undressing but also "comfortable" while exhibiting high conformability to movement. Usually, clothing is repeatedly used and therefore, even when it is highly stretchable, if the strength is low, the clothing is disadvantageously fully stretched. Accordingly, the residual strain in the elastic recovery test becomes an important indicator, and it can be said that as the residual strain is smaller, the clothing has more excellent durability.

In order to enhance the flexibility of polyurethane, a method of using a polyether polyol having a large molecular weight, and a method of increasing the proportion of a soft segment moiety (polyether polyol moiety) are known. However, the increase in proportion of the soft segment moiety is often associated with reduction in the mechanical properties or heat-resistant temperature of polyurethane. Accordingly, studies are being conducted for producing a polyurethane excellent in various physical properties by increasing the molecular weight of a polyether polyol.

Usually, a polyether polyol having a number average molecular weight of approximately from 1,000 to 2,000 is preferably used for polyurethane, but in order to enhance various physical properties, polyurethanes using, as a raw material, polytetramethylene glycols having a great variety of molecular weights are being studied.

For example, Patent Document 6 discloses a liquid radiation-curable resin composition having low Young's modulus and high stretch, wherein a polyether urethane (meth)acrylate oligomer is polymerized using a polytetramethylene ether glycol having a number average molecular weight of 4,000.

Patent Document 7 discloses a polyurethane resin solution having excellent solution stability and providing a film excellent in breaking elongation and elastic recovery, wherein a polyurethane resin solution is produced using, as a raw material, a polytetramethylene ether glycol having a number average molecular weight of 2,300 or 3,100.

Patent Document 8 discloses a polyurethane resin for a polishing agent having high hardness and being improved in the abrasion resistance•alkali resistance, wherein a polyurethane is produced using, as a raw material, a polytetramethylene ether glycol having a number average molecular weight of 3,500.

Patent Document 9 discloses a thermoplastic polyurethane resin composition using, as a raw material, a polytetramethylene ether glycol having a number average molecular weight of 3,000, with the purpose of ensuring low hardness and flexibility and enhancing stretchability.

In addition, a polyester elastomer (a polyester-polyether copolymer) containing a polyester as a hard segment and a polyether polyol as a soft segment is excellent in the property such as heat resistance and oil resistance and is being used for an automotive member, a casing of household appliance, a damping material, etc.

Particularly, in the case of using the elastomer as a damping material, a material having low hardness and being excellent in flexibility and elastic recovery is required. In order to reduce the hardness and enhance the flexibility of a thermoplastic polyester elastomer produced using a polyether polyol as a raw material, a method of using a polyether polyol having a large molecular weight, or a method of increasing the proportion of the soft segment moiety may be conceived. However, a thermoplastic polyester elastomer having sufficient flexibility, despite use of, as a raw material, a polyether polyol having a number average molecular weight of about 3,000, is not disclosed. In the case of intending to enhance the flexibility by increasing the proportion of the soft segment moiety, there is also a problem that the melting point of the polyester elastomer lowers and the heat resistance deteriorates (Patent Documents 10 and 11).

BACKGROUND ART DOCUMENT

Patent Document

Patent Document 1: JP-A-60-108424 (the term "JP-A" as used herein means an "unexamined published Japanese patent application")
Patent Document 2: JP-A-1-92221
Patent Document 3: JP-A-62-220520
Patent Document 4: JP-A-3-126722
Patent Document 5: JP-A-2001-502011
Patent Document 6: JP-A-2004-43626
Patent Document 7: JP-A-2002-80553
Patent Document 8: JP-A-6-220151
Patent Document 9: JP-A-4-255712
Patent Document 10: JP-A-2014-47222
Patent Document 11: JP-A-2011-102365

Non-Patent Document

Non-Patent Document 1: Katsuji Matsunaga, "Fundamentals and Applications in Polyurethane", CMC Publishing Co., Ltd., November 2006, pp. 96-106

SUMMARY OF INVENTION

Problem that Invention is to Solve

Studies by the present inventors revealed that when a polyether polyol having a number average molecular weight higher by 300 or more than that of the raw material polyether polyol is tried to be produced in line with the description of Patent Document 1 by using, as a raw material, a polyether polyol having a number average molecular weight of 2,500 or more, separating property deteriorates, for example, since respective layers are suspended, it is difficult to distinguish the interface therebetween.

Deterioration of separating property leads to not only decrease in the yield at the time of production of a polyether polyol but also increase in the time required until the mixed solution completes layer separation, and the productivity of the polyether polyol is therefore significantly reduced.

Further studies revealed that when the layer construction during separation step includes three or more layers, the operation of extracting only a layer containing the target polyether polyol becomes cumbersome. In addition, a plurality of organic solvents must be used in combination so as to configure the layer construction during the separation step to include three or more layers, and this causes a rise in the usage cost and treatment cost of organic solvents.

Furthermore, as a result of studies by the present inventors, it has been clarified that when a polyether polyol having a number average molecular weight of 3,500 or more produced using a cyclic ether as a raw material and fluorosulfuric acid as a ring-opening polymerization catalyst is directly used as a polyurethane raw material, the flexibility and elastic recovery of the obtained polyurethane are insufficient.

Similarly to polyurethane, it is presumed that also in the case of a polyester elastomer using a polyether polyol as a soft segment moiety, the flexibility and elastic recovery of the obtained polyester elastomer are insufficient.

A first object of the present invention is to provide a high-molecular-weight polyether polyol ensuring that when used as a polyurethane raw material, a polyurethane having excellent flexibility and elastic recovery can be obtained.

A second object of the present invention is to provide a high-molecular-weight polyether polyol ensuring that when used as a polyester elastomer raw material, a polyester elastomer having excellent flexibility and elastic recovery can be obtained.

A third object of the present invention is to provide a method for producing, with high productivity, a polyether polyol having a higher number average molecular weight and a narrower molecular weight distribution than those of the raw material polyether polyol.

A fourth object of the present invention is to provide a polyurethane excellent in the flexibility and elastic recovery, and a polyurethane and a polyester elastomer each being excellent in the flexibility and elastic recovery and having excellent productivity.

Means for Solving Problem

The present inventors have made intensive studies to attain these objects, as a result, it has been found that when a polyether polyol having a specific number average molecular weight and a specific molecular weight distribution is used as a raw material, the above-described problems can be solved.

In addition, the present inventors have made intensive studies to attain those objects, as a result, it has been found that when a separation step of subjecting a mixed solution containing a raw material polyether polyol, water and an alcohol to layer separation and then obtaining a polyether polyol having a number average molecular weight higher by 300 or more than that of the raw material polyether polyol, a polyether polyol capable of solving the above-described problems can be obtained.

That is, the gist of the present invention is as follows.
[1] A polyether polyol, which has a number average molecular weight of 3,500 to 5,500 and a molecular weight distribution of 1.7 to 3.0.
[2] The polyether polyol as described in [1] above, comprising:
90 mol % or more of a 1,4-butanediol unit relative to all repeating units of the polyether polyol.
[3] A polyester elastomer, comprising, as constituent units:
the polyether polyol as described in [1] or [2] above;
a diol (excluding the polyether polyol); and
dicarboxylic acid.
[4] A method for producing a polyether polyol, comprising:
a separation step of subjecting a mixed solution containing a raw material polyether polyol having a number average molecular weight of 2,500 or more, water and an alcohol to layer separation; and then obtaining a polyether polyol having a number average molecular weight higher by 300 or more than that of the raw material polyether polyol.
[5] The method for producing a polyether polyol as described in [4] above,
wherein the molecular weight distribution of the raw material polyether polyol is 2.0 or more and the molecular weight distribution of the obtained polyether polyol is lower by 0.2 or more than the molecular weight distribution of the raw material polyether polyol.
[6] The method for producing a polyether polyol as described in [4] or [5] above,
wherein the obtained polyether polyol has a number average molecular weight of 3,500 to 5,500 and a molecular weight distribution of 1.7 to 3.0.
[7] The method for producing a polyether polyol as described in any one of [4] to [6] above,
wherein the mixed solution temperature during the separation step is 31° C. or more.
[8] The method for producing a polyether polyol as described in any one of [4] to [7] above,
wherein at least one member selected from the group consisting of an organic carboxylic acid, an organic sulfonic acid and an inorganic acid is added to the mixed solution before the separation step.
[9] The method for producing a polyether polyol as described in [8] above,
wherein phosphoric acid or sulfuric acid is added as an inorganic acid to the mixed solution before the separation step.
[10] The method for producing a polyether polyol as described in any one of [4] to [9] above,
wherein the alcohol is an aliphatic alcohol having a carbon number of 1 to 10.
[11] A polyurethane, comprising, as constituent units:
a polyether polyol having a number average molecular weight of 3,000 to 5,500 and a molecular weight distribution of 1.7 to 3.0; and
an isocyanate compound.
[12] The polyurethane as described in [11] above, further comprising:
a chain extender (excluding the isocyanate compound).
[13] A fiber, which uses the polyurethane as described in [11] or [12] above.
[14] An artificial or synthetic leather, which uses the polyurethane as described in [11] or [12] above.
[15] A coating agent, which uses the polyurethane as described in [11] or [12] above.

Effects of Invention

The polyether polyol of the present invention is used for a polyurethane raw material, whereby a polyurethane excellent in the flexibility and elastic recovery can be produced.

An elastic fiber produced using the polyurethane of the present invention as a raw material is used for a raw material of clothing, whereby clothing excellent in "ease of wearing" and "freedom of movement" can be produced.

According to the production method of a polyether polyol of the present invention, a polyether polyol having a higher number average molecular weight and a narrower molecular weight distribution that those of the raw material polyether polyol can be produced with high productivity. In particular, when a polyether polyol having a high number average molecular weight and a broad molecular weight distribution is used for a raw material, a remarkable effect is exerted.

The polyether polyol obtained by the production method of the present invention has, despite the number average molecular weight of the same level, a narrower molecular weight distribution than that of a polyether polyol produced directly by a polymerization reaction and is therefore suitable for a raw material of a polyurethane or a polyester elastomer.

Furthermore, according to the present invention, a polyurethane and a polyester elastomer each being excellent in the flexibility and elastic recovery as well as in the abrasion resistance, hydrolysis resistance, light fastness, oxidation resistance, oil resistance and processability and having good productivity can be provided.

MODE FOR CARRYING OUT INVENTION

Representative modes for carrying out the present invention are specifically described below, but these are an example (representative example) of the embodiment of the present invention, and the present invention is not limited to the following embodiments as long as the gist thereof is observed. In the description of the present invention, "mass" has the same meaning as "weight".

The polyether polyol of the present invention is characterized by having a number average molecular weight of 3,500 to 5,500 and a molecular weight distribution of 1.7 to 3.0.

The polyether polyol of the present invention is explained below.

[1] Polyether Polyol

The polyether polyol of the present invention is a hydroxy compound having at least two or more ether bonds in the main framework of the molecule. The repeating unit in the main framework of the polyether polyol may be either a saturated hydrocarbon or an unsaturated hydrocarbon and includes, for example, 1,4-butanediol unit, 2-methyl-1,4-butanediol unit, 3-methyl-1,4-butanediol unit, 1,3-propanediol unit, 1,2-propylene glycol unit, 2-methyl-1,3-propanediol unit, 2,2-dimethyl-1,3-propanediol unit, 3-methyl-1,5-pentanediol unit, 1,2-ethylene glycol unit, 1,6-hexanediol unit, 1,7-heptanediol unit, 1,8-octanediol unit, 1,9-nonanediol unit, 1,10-decanediol unit, and 1,4-cyclohexanedimethanol unit. Above all, in view of mechanical properties of the polyurethane obtained using the polyether polyol as a raw material, it is preferable to contain a 1,4-butanediol unit in an amount of usually 90 mol % or more, preferably 93 mol % or more, more preferably 95 mol % or more, still more preferably 98 mol % or more, yet still more preferably 99 mol % or more, relative to all repeating units in the main framework of the polyether polyol. Here, in examples of the repeating unit in the main framework of the polyether polyol of the present invention, a "1,4-butanediol unit" is referred to and this means that a structure ($C_4H_8O$) resulting from elimination of water from 1,4-butanediol is contained as a repeating unit in the main framework. The same applies to other repeating units recited.

In addition, a polytetramethylene ether glycol where the repeating unit in the main framework is composed of only a 1,4-butanediol unit, or a 3-methyltetrahydrofuran-tetrahydrofuran copolymerized polyether polyol having a 1,4-butanediol unit and a 3-methyl-1,4-butanediol unit, may also be preferably used from the viewpoint of enhancing mechanical properties of the polyurethane. Among others, for the reason that a polyurethane excellent in flexibility and elastic recovery is obtained, polytetramethylene ether glycol is more preferably used. These polyether polyols may be used by mixing some of them.

The number average molecular weight of the polyether polyol of the present invention is 3,500 or more, preferably 3,600 or more, more preferably 3,700 or more, still more preferably 3,800 or more, and on the other hand, the upper limit is usually 5,500 or less, preferably 5,000 or less, more preferably 4,600 or less, still more preferably 4,500 or less, yet still more preferably 4,300 or less. When the number average molecular weight of the polyether polyol is in the range above, a polyurethane or polyester elastomer excellent in the flexibility and elastic recovery can be produced by using the polyether polyol as a raw material.

The number average molecular weight (Mn) and weight average molecular weight (Mw) as used in the present invention mean the values measured under the following conditions.

A tetrahydrofuran solution of the polyether polyol is prepared and then measured using a GPC apparatus [product name: "HLC-8220", manufactured by Tosoh Corp. (column: TSKgelSuper HZM-N (four columns)]. For the calibration of GPC, a POLYTETRAHYDROFURAN Calibration kit of POLYMER LABORATORIES, UK is used.

The molecular weight distribution (weight average molecular weight (Mw)/number average molecular weight (Mn)) of the polyether polyol of the present invention is 3.0 or less, preferably 2.9 or less, more preferably 2.8 or less, still more preferably 2.7 or less, yet still more preferably 2.6 or less, even yet still more preferably 2.2 or less, particularly preferably 2.15 or less, more particularly preferably 2.10 or less, and most preferably 2.05 or less. On the other hand, the lower limit of the molecular weight distribution of the polyether polyol is 1.7 or more, preferably 1.8 or more, more preferably 1.9 or more, still more preferably 2.0 or more.

If a polyurethane is produced using, as a raw material, a polyether polyol having a molecular weight distribution exceeding the upper limit value above, the polyurethane obtained has not only insufficient flexibility and elastic recovery but also high viscosity, giving rise to a problem of poor handleability at the time of polymer production. A polyether polyol having a molecular weight distribution less than the lower limit value is difficult to produce, and if its industrial production is intended, the yield significantly decreases to deteriorate the productivity.

The upper limit of the viscosity of the polyether polyol of the present invention as measured at 40° C. by means of an E-type rotary viscometer is usually 6,500 mPa·s or less, preferably 6,000 mPa·s or less, more preferably 5,500 mPa·s or less. On the other hand, the lower limit of the viscosity of the polyether polyol is usually 1,000 mPa·s or more, preferably 1,500 mPa·s or more, more preferably 2,000 mPa·s or more.

When the viscosity of the polyether polyol of the present invention is in the range above, the handleability at the time of production is excellent, so that the polyether polyol can be produced with good productivity. In addition, a polyurethane using, as a raw material, a polyether polyol having a viscosity in the range above is likely to have excellent flexibility and elastic recovery. Here, the viscosity of the polyether polyol means the viscosity of the polyether polyol itself.

Details of the mechanism in which the polyurethane using, as a raw material, the polyether polyol of the present invention having a number average molecular weight (Mn) of 3,500 to 5,500 and Mw/Mn of 1.7 to 3.0 exhibits excellent physical properties are unknown, but a hypothesis is set forth below.

When the number average molecular weight is same, as the molecular weight distribution is broader, the abundance of each of polyether polyols having a high molecular weight and a low molecular weight increases. In addition, since the viscosity of the polyether polyol greatly affects the abundance of a polyether polyol in the high molecular weight region, the viscosity of the polyether polyol increases as well.

A polyether polyol having a number average molecular weight of 3,500 or more produced using a ring-opening polymerization reaction catalyst such as fluorosulfuric acid has a broad molecular weight distribution, and the abundance of each of polyether polyols in high and low molecular weight regions is therefore high. Usually, as the abundance of a high-molecular-weight form in the polyether polyol is higher, the physical properties of polyurethane are enhanced, but conversely, as the abundance of a low-molecular-weight form is higher, the physical properties of polyurethane are deteriorated. A polyether polyol having a broad molecular weight distribution and a number average molecular weight of 3,500 or more produced using a ring-opening polymerization reaction cannot enable desired physical properties of polyurethane to be exhibited, and this is considered to arise from the fact that the effect of a low-molecular-weight form to deteriorate the physical properties of polyurethane is larger than the effect of a high-molecular-weight form to enhance the physical properties of polyurethane.

On the other hand, in the polyether polyol of the present invention having a reduced molecular weight distribution, the abundance of a high-molecular-weight form is low, compared with a polyether polyol having a broad molecular weight distribution, and the effect of enhancing physical properties of polyurethane accordingly decreases, but thanks to the low abundance of a low-molecular-weight form, reduction in the physical properties of polyurethane due to a low-molecular-weight form is less likely to occur. In a polyether polyol having a number average molecular weight of 3,500 or more, the effect of enhancing the physical properties of polyurethane, associated with decrease in the abundance of a low-molecular-weight form, is large compared with reduction in the physical properties of polyurethane due to decrease in the abundance of a high-molecular-weight form, and it is therefore thought that when the number average molecular weight is same, as the polyether polyol has a lower viscosity and a narrower molecular weight distribution, the physical properties of the obtained polyurethane are more enhanced.

The present inventors have made studies on the assumption that since the rate of improvement/deterioration of physical properties of the obtained polyurethane is changed by the existence ratio of a high-molecular-weight form and a low-molecular-weight form in the polyether polyol, the molecular weight distribution or viscosity must be optimized in accordance with the number average molecular weight of the target polyether polyol. As a result, the configuration of the present invention has been achieved.

In addition, it is thought that a polytetramethylene ether glycol (PTMG) having a number average molecular weight of 1,000 to 2,000, which is generally used as a polyurethane raw material, has a relatively narrow molecular weight distribution compared with PTMG having a number average molecular weight of 3,500 or more and therefore, reduction in the physical properties of polyurethane due to a low-molecular-weight form does not emerge.

The polyether polyol of the present invention is not particularly limited in its production method but is preferably produced by the below-described "Production Method of Polyether Polyol of the Present Invention".

[2] Production Method of Polyether Polyol

The production method of a polyether polyol of the present invention is characterized by including a separation step of subjecting a mixed solution containing a raw material polyether polyol having a number average molecular weight of 2,500 or more, water and an alcohol to layer separation and then obtaining a polyether polyol having a number average molecular weight higher by 300 or more than that of the raw material polyether polyol.

<Raw Material Polyether Polyol>

As the raw material polyether polyol for use in the separation step, a hydroxy compound having a number average molecular weight of 2,500 or more and having at least two or more ether bonds in the main framework of the molecule is used. The repeating unit in the main framework of the raw material polyether polyol is the same as that of the polyether polyol above.

The number average molecular weight of the raw material polyether polyol for use in the present invention is usually 2,500 or more, preferably 2,600 or more, more preferably 2,700 or more, still more preferably 3,000 or more. The upper limit value of the number average molecular weight is not particularly limited but is usually 4,000 or less, preferably 3,800 or less, more preferably 3,700 or less, still more preferably 3,600 or less, yet still more preferably 3,500 or less.

When the number average molecular weight of the raw material polyether polyol is not less than the lower limit above, a polyether polyol having a high number average molecular weight and a narrow molecular weight distribution can be obtained with high yield. When the number average molecular weight of the raw material polyether polyol is not more than the upper limit above, the raw material polyether polyol is sufficiently dissolved in an alcohol to enhance the separating property at the time of layer separation.

Here, the conditions for measuring the number average molecular weight of the raw material polyol are as described above.

The molecular weight distribution indicated by weight average molecular weight/number average molecular weight of the raw material polyether polyol used in the separation step is not particularly limited but is usually 2.0 or more, preferably 2.1 or more, more preferably 2.2 or more, still more preferably 2.3 or more. On the other hand, the upper limit of the molecular weight distribution is not particularly limited but is usually 5.0 or less, preferably 4.5 or less, more preferably 4.0 or less, still more preferably 3.0 or less, yet still more preferably 2.8 or less, even yet still more preferably 2.7 or less, and most preferably 2.6 or less.

If the molecular weight distribution of the raw material polyether polyol exceeds the upper limit value above, the viscosity of the raw material polyether polyol rises, and the solubility in an alcohol decreases to deteriorate layer separation. If the molecular weight distribution of the raw material polyether polyol is less than the lower limit value above, it is likely that the yield of the polyether polyol significantly decreases and the productivity deteriorates.

<Alcohol>

The alcohol used in the separation step must have one or more hydroxy groups. Specific compounds include, for example, an aliphatic alcohol such as methanol, ethanol, propanol, isopropanol, hexanol, heptanol, octanol, nonanol, decanol, ethyl hexanol, propylene glycol and glycerin; and an aromatic alcohol such as salicyl alcohol and benzyl alcohol. One of these may be used alone, or two or more thereof may be used in combination. Among these, in view of solubility for the raw material polyether polyol and water, an alcohol having a carbon number of 1 to 10 is preferred, an aliphatic alcohol having a carbon number of 1 to 10 is more preferred, methanol, ethanol, propanol, isopropanol and butanol are still more preferred, and in view of ease of handling and solubility for the polyether polyol, above all, methanol and ethanol are preferably used.

<Water-Soluble Acid Compound>

In the present invention, at least one compound (hereinafter, sometimes referred to as a water-soluble acid compound) selected from the group consisting of an organic carboxylic acid, an organic sulfonic acid, and an inorganic acid may be added to the mixed solution before the separation step. Addition of a water-soluble acid compound to the mixed solution produces a tendency that not only the distribution factor of a polyether polyol having a low number average molecular weight to the water layer is enhanced to increase the transparency of each layer at the time of layer separation but also the number average molecular weight of the polyether polyol obtained from the oil layer increases.

In the present invention, at the time of layer separation, a layer using water as a main component and containing a polyether polyol with high hydrophilicity (specifically, a polyether polyol with low molecular weight) is referred to as a water layer, and the layer mainly containing an alcohol and a polyether polyol with low hydrophilicity (specifically, a polyether polyol with high molecular weight) is referred to as an oil layer.

It is likely that an acid component once incorporated into the oil layer cannot be removed in a solvent removal step by heating and is contained in the polyether polyol after distilling off an alcohol. Accordingly, among the above-described water-soluble acid compounds, an inorganic acid having high solubility in water and being readily distributed to the water layer at the time of separation step is preferably used.

The organic carboxylic acid includes, for example, those having one carboxyl group, such as formic acid, acetic acid, propionic acid, butyric acid, isobutyric acid, valeric acid, ethylmethylacetic acid and timethylacetic acid, and an organic polycarboxylic acid having two or more carboxyl groups, such as oxalic acid, succinic acid, malonic acid, maleic acid, fumaric acid, citric acid, itaconic acid, glutaric acid, dimethylmalonic acid, citraconic acid, tartaric acid, malic acid, adipic acid and heptanoic acid. Aliphatic polycarboxylic acids are preferred because of their high solubility in a mixed solution of water, an alcohol and a polyether polyol and good dissolution stability, and among others, an aliphatic polycarboxylic acid having a carbon number of 2 to 10 is preferred. Preferable polycarboxylic acids include oxalic acid, malonic acid, succinic acid, tartaric acid, glutaric aid, malic acid, adipic acid, and citric acid, and more preferable polycarboxylic acids include malonic acid, tartaric acid, and citric acid.

The organic sulfonic acid includes an aliphatic sulfonic acid such as methanesulfonic acid, ethanesulfonic acid, n-propanesulfonic acid, isopropanesulfonic acid and n-butanesulfonic acid, and an aromatic sulfonic acid such as phenylsulfonic acid. Among these, in view of water solubility, an alkylsulfonic acid such as methanesulfonic acid and ethanesulfonic acid is preferred, and methanesulfonic acid is more preferred.

The inorganic acid includes hydrochloric acid, sulfuric acid, phosphoric acid, hydrohalic acid, hydrofluorosilicic acid, etc. Among these, for the reason that in the separation step, the solubility in a solution of water, an alcohol and a polyether polyol is high and the dissolution stability is good, phosphoric acid and sulfuric acid are preferred.

Details of the mechanism in which when at least one member selected from the group consisting of an organic carboxylic acid, an organic sulfonic acid and an inorganic acid is added to the mixed solution before the separation step, the number average molecular weight of the polyether polyol obtained after the separation step increases, are unknown, but a hypothesis is set forth below.

In general, a polyether polyol having a higher molecular weight is more hydrophobic and is less likely to mix with water but dissolves in alcohol, and an alcohol having dissolved therein a polyether polyol is distributed to an oil layer or a water layer according to the temperature at layer separation, the kind of alcohol, the ratio between alcohol and water, and the solubility of polyether polyol in water/alcohol.

In the present invention, a water-soluble acid compound is added to a mixed solution containing the raw material polyether polyol, water and an alcohol before the separation step, and layer separation is performed in the co-presence of an acid component, whereby a polyether polyol having a high molecular weight, compared with the case of not adding a water-soluble acid compound, is obtained.

The reason therefor is considered to be that the water-soluble acid compound specified in the present invention has high solubility in water and is likely to be distributed to the water layer at the time of separation step and distribution of many acid components to water layer enhances the extraction efficiency of a low-molecular-weight polyether polyol to the water layer and allows the polyether polyol contained in the oil layer to have a high molecular weight.

Esterification of a polyether polyol may be thought to partially occur due to the presence of an acid component, but it may also be thought that the compatibility with oil layer and water layer is changed by the formation of an ester form and a low-molecular-weight polyether polyol having been extracted to the oil layer side when an acid component is not present becomes readily extracted to the water layer side.

The addition amount of the water-soluble acid compound is not particularly limited, but the lower limit value is usually 0.0001 wt % or more, preferably 0.0002 wt % or more, more preferably 0.0005 wt % or more, still more preferably 0.001 wt % or more, yet still more preferably 0.002 wt % or more, relative to the raw material polyether polyol. The upper limit value is usually 1 wt % or less, preferably 0.5 wt % or less, more preferably 0.2 wt % or less, still more preferably 0.1 wt % or less, relative to the raw material polyether polyol. In the case of using a plurality of water-soluble acid compounds in combination, the addition amount of the water-soluble acid compound as referred to in the present invention means the total amount.

When the addition amount of the water-soluble acid compound is not more than the upper limit value above, the content of acid remaining in the polyether polyol after distilling off the solution tends to be reduced. On the other hand, when the addition amount of the water-soluble acid compound is not less than the lower limit value, it is likely that the separating property is enhanced and the number average molecular weight of the polyether polyol obtained from the oil layer increases.

<Other Components>

As long as the effects of the present invention are not impaired, other components besides water, an alcohol, the raw material polyether polyol and a water-soluble acid compound may be added to the mixed solution. Other components include a hydrocarbon compound.

<Hydrocarbon Compound>

The hydrocarbon compound that may be used in the present invention is preferably a compound having a carbon number of 3 to 10. Examples thereof include an unsaturated hydrocarbon such as isoprene; a saturated hydrocarbon such as n-heptane and n-octane; and an alicyclic hydrocarbon such as cyclopropane, cyclopentane, cyclohexane, methylcyclohexane, cyclooctane, toluol, ethylbenzole and decalin. In view of solubility in a polyether polyol of a cyclic oligomer (a dimer to pentamer of a cyclic ether compound; average number molecular weight: 450 or less) in the raw material polyether polyol, a saturated aliphatic hydrocarbon having a carbon number of 4 to 7 is preferably used. One of these compounds may be used alone, or two or more thereof may be used in combination.

In the case of adding a hydrocarbon compound in the layer separation step of the present invention, the addition amount of the hydrocarbon compound is usually 10 wt % or more, preferably 15 wt % or more, more preferably 20 wt % or more, relative to the raw material polyether polyol, and on the other hand, the upper limit is usually 400 wt % or less, preferably 300 wt % or less, more preferably 200 wt % or less, still more preferably 150 wt % or less.

If the amount of the hydrocarbon compound added to the mixed solution is too large, the cost of the hydrocarbon compound or the energy cost necessary for removing the hydrocarbon compound tends to rise. If the addition amount of the hydrocarbon compound is too small, the cyclic oligomer in the raw material polyether polyol may not be sufficiently separated.

Here, if the number average molecular weight of the raw material polyether polyol is 2,600 or more, since the cyclic oligomer content in the raw material polyether polyol is extremely small, the effect of addition of the hydrocarbon compound tends not to be obtained. Accordingly, in the case where the number average molecular weight of the raw material polyether polyol is 2,600 or more, the amount of the hydrocarbon compound added to the mixed solution is preferably small, and it is more preferable not to add the hydrocarbon compound.

<Production Method of Raw Material Polyether Polyol>

The production method of the raw material polyether polyol for use in the present invention is described below, but the present invention is not limited to the production method described below.

In general, a polyether polyol is produced by performing a ring-opening polymerization reaction of a cyclic ether as a raw material or a derivative thereof in the presence of a ring-opening polymerization reaction catalyst.

<Ring-Opening Polymerization Step>

As the raw material, a cyclic ether such as tetrahydrofuran (THF), ethylene oxide, propylene oxide, oxetane, tetrahydropyran, oxepane and 1,4-dioxane, or a cyclic ether derivative formed by substituting an alkyl group, a halogen atom, etc. on part of the hydrocarbon of the cyclic ether, may be used.

The ring-opening polymerization reaction catalyst at the production of a polyether polyol is not particularly limited as long as it is a catalyst capable of producing a polyether polyol, and both a homogeneous catalyst and/or a heterogeneous catalyst may be used. Examples thereof include a homogeneous catalyst such as fluorosulfuric acid, fumed sulfuric acid, hydrohalic acid, acetic anhydride and heteropolyacid; and as the heterogeneous catalyst, a heterogeneous catalyst such as composite metal oxide, zeolite, metalloaluminosilicate, perfluorosulfonic acid resin and activated clay.

Among others, for the reason that the proportion of a high-molecular-weight component in the obtained polyether polyol is large and the molecular weight can be made high in a post-process, fluorosulfuric acid, fumed sulfuric acid, and hydrohalic acid are preferably used, and fluorosulfuric acid is more preferably used.

In addition to the ring-opening polymerization reaction catalyst, a copolymerized polyether polyol obtained by random copolymerization of one or more compounds selected from an alkanediol having a carbon number of 2 to 10, an alkylene oxide, oxetane, cyclic acetal, 3-methyltetrahydrofuran and 2-methyltetrahydrofuran, with a raw material cyclic ether may be used as a reaction initiator.

The amount of the ring-opening polymerization reaction catalyst used is selected according to the kind of the catalyst or production conditions and is not particularly limited. For example, in the case of using a homogeneous catalyst such as fluorosulfuric acid, the amount used thereof is usually from 1 to 20 wt %, preferably from 2 to 15 wt %, more preferably from 3 to 10 wt %, relative to the total of the cyclic ether and a derivative thereof. In the case of using a heterogeneous catalyst such as metal oxide, the amount used thereof is usually from 0.1 to 100 wt %, preferably from 0.1 to 10 wt %, relative to the total of the cyclic ether and a derivative thereof.

By controlling the amount of the ring-opening polymerization catalyst used, the number average molecular weight of the obtained polyether polyol can likely be controlled. In the present invention, when the amount of the ring-opening polymerization catalyst used is in the range above, a polyether polyol having a target number average molecular weight can likely be obtained.

The ring-opening polymerization reaction temperature can be selected usually from the range of 0 to 200° C. and is preferably from 10 to 80° C., more preferably from 20 to 60° C. The reaction temperature can be selected from the range of normal pressure to 10 MPa and is preferably from normal pressure to 5 MPa. The reaction time is not particularly limited but is preferably from 0.1 to 20 hours, more preferably from 0.5 to 15 hours. In the case of a continuous flow reaction, the reaction time above means the residence time.

When the reaction conditions are in the ranges above, a polyether polyol having a target molecular weight can be stably produced.

<Hydrolysis Reaction Step>

A diester form of polyether polyol, in which both ends of the polyether polyol obtained in the ring-opening polymerization step are converted to a sulfuric acid ester, a fluorosulfuric acid ester, an acetic acid ester, etc., can be grown to a polyether polyol through a hydrolysis reaction by adding water to the ring-opening polymerization reaction solution or through a transesterification reaction by adding an aliphatic alcohol having a carbon number of 1 to 10 to the ring-opening polymerization reaction solution.

The reaction solution after the ring-opening polymerization reaction contains an unreacted raw material in addition to a diester form of polyether polyol and therefore, in the case of performing a hydrolysis step, the reaction is preferably performed at a temperature higher than the boiling point of the unreacted raw material so as to distill off the unreacted raw material. The hydrolysis reaction temperature is usually 80° C. or more, preferably 90° C. or more, more preferably 94° C. or more, and the upper limit is usually 120° C. or less, preferably 110° C. or less, more preferably 105° C. or less.

When the hydrolysis reaction temperature is in the range above, an unreacted raw material or water contained in the reaction solution after the ring-opening polymerization reaction can likely be sufficiently distilled off. In particular, when the number average molecular weight of the polyether polyol produced is high, since the viscosity of the polyether polyol is high, an unreacted raw material or water is less likely to be distilled off. Accordingly, the hydrolysis reaction is preferably performed by setting the hydrolysis temperature at a higher level.

If the hydrolysis reaction temperature is too low, the rate of distilling off of an unreacted raw material tends to drop in the hydrolysis step, and the separating property in the subsequent separation step tends to deteriorate due to the remaining unreacted raw material.

The hydrolysis reaction time can be set within a known range by taking into account the amount of an unreacted raw material or water in the reaction solution but is usually 1 hour or more, preferably 1.5 hours or more, and the upper limit is usually 24 hours or less, preferably 6 hours or less.

In the case of performing a transesterification reaction, the reaction may be performed under the same conditions as those described in known methods. For example, when the ring-opening polymerization reaction is performed using a heterogeneous catalyst and an acid anhydride in combination, the intermediate of polyether polyol in the reaction solution obtained by the reaction is a diatetic acid ester form of polyether polyol and therefore, is mixed with an alcohol, transesterified by an alcoholysis reaction in the presence of a transesterification catalyst, and thereby converted to the final product polyether polyol. The alcohol used here is preferably an aliphatic alcohol having a carbon number of 1 to 4, such as methanol, ethanol, propanol, isopropanol and butanol, more preferably methanol, ethanol or propanol. The addition amount of the alcohol in the transesterification reaction is usually from 50 to 500 wt %, preferably from 100 to 300 wt %, relative to the diester form of polyether polyol. If the amount of the alcohol is small relative to the diester form of polyether polyol, the transesterification reaction tends to proceed slowly, whereas if the amount of the alcohol is too large, it is likely that a large reactor volume is required or removal of the excess alcohol is costly, leading to deterioration of the productivity.

As the transesterification catalyst for use in the alcoholysis reaction, an alkoxide of an alkali metal such as lithium, sodium, potassium, cesium and rubidium is used, and among these, an alkoxide of sodium or potassium is preferred. Specific preferable examples are sodium methoxide, sodium ethoxide, sodium isopropoxy, potassium methoxide, potassium ethoxide, and potassium isopropoxide. The metal alkoxide is preferably added in an amount of 50 to 2,000 ppm by weight, more preferably from 100 to 500 ppm by weight, relative to the diester form of polyether polyol. The alcoholysis reaction can be performed under known conditions, and the reaction pressure is usually from 0.1 to 2.0 MPa, preferably from 1.0 to 1.5 MPa. The reaction temperature is preferably from 60 to 180° C.

<Production Method of Polyether Polyol>

The method for producing a polyether polyol of the present invention includes a step (separation step) of subjecting a mixed solution containing at least a raw material polyether polyol having a number average molecular weight of 2,500 or more (hereinafter, sometimes simply referred to as "raw material polyether polyol"), an alcohol and water to layer separation.

The polyether polyol produced as above by a ring-opening polymerization reaction usually contains a component having a high molecular weight (high-molecular-weight form) or a component having a low molecular weight (low-molecular-weight form).

Due to containing a high-molecular-weight form, the viscosity of the polyether polyol rises. A polyether polyol having high viscosity tends not only to show poor handleability at the time of production of polyurethane but also to deteriorate in the compatibility with other raw materials during polyurethane production, which adversely affects the polymerization reactivity. In addition, due to containing a low-molecular-weight form, when used as a polyurethane raw material, the physical properties of the obtained polyurethane are likely to be reduced.

Accordingly, as one means for producing the polyether polyol of the present invention, there is a method where a polyether polyol having a number average molecular weight lower than the target molecular weight, produced by a ring-opening polymerization reaction of cyclic ether, is used as the raw material polyether polyol when performing layer separation. It is likely that a low-molecular-weight form in the raw material polyether polyol is removed by performing layer separation and a polyether polyol having a high-molecular-weight form and low-molecular-weight form at low abundances can be produced.

The separation step includes a step of subjecting a mixed solution containing at least a polyether polyol, water, and an alcohol to layer separation at least into two layers of upper layer and lower layer, and recovering the lower layer containing a polyether polyol having a high number average molecular weight.

The upper layer is a water layer and is a layer containing a polyether polyol having high hydrophilicity (specifically, a polyether polyol having a low molecular weight), where main components are water and a ring-opening polymerization reaction catalyst, which are added in the hydrolysis step, and a hydrolysis product.

The lower layer is an oil layer and is a layer mainly containing a polyether polyol having low hydrophilicity (specifically, a polyether polyol having a high molecular weight).

An unreacted raw material during the ring-opening polymerization reaction, various impurities by-produced in the production process, etc. are contained in either the upper layer or the lower layer according to the liquid composition at the time of layer separation.

<Re: Mixed Solution>

Suitable ranges of the contents of raw material polyether polyol, water and alcohol contained in the mixed solution vary depending on the kind or number average molecular weight of raw material polyether polyol or the kind of alcohol, but the amount of the alcohol used per 100 parts by weight of the raw material polyether polyol is usually 50 parts by weight or more, preferably 100 parts by weight or more, more preferably 130 parts by weight or more, still more preferably 150 parts by weight or more. On the other hand, the upper limit is not particularly limited but is usually 1,000 parts by weight or less, preferably 800 parts by weight or less, more preferably 600 parts by weight or less, still more preferably 500 parts by weight or less, yet still more preferably 400 parts by weight or less, and most preferably 300 parts by weight or less.

When the amount of alcohol used relative to the raw material polyether polyol is not less than the lower limit value above, it is likely that a sufficient dissolution amount of polyether polyol in alcohol can be ensured and the mixed solution can be prevented from getting cloudy due to undissolved polyether polyol at the time of layer separation. On the other hand, when the amount of alcohol used relative to the raw material polyether polyol is not more than the upper limit above, the heat quantity necessary for recovering the polyether polyol dissolved in alcohol by distillation tends to decrease.

The amount of water used per 100 parts by weight of the raw material polyether polyol is usually 10 parts by weight or more, preferably 20 parts by weight or more, more preferably 40 parts by weight or more, still more preferably 50 parts by weight or more. On the other hand, the upper limit is usually 1,000 parts by weight or less, preferably 600 parts by weight or less, more preferably 500 parts by weight or less, still more preferably 400 parts by weight or less, yet still more preferably 300 parts by weight or less, and most preferably 200 parts by weight or less.

When the amount of water used relative to the raw material polyether polyol is not less than the lower limit value above, a problem that layer separation itself does not occur tends to be prevented. When the amount of water used relative to the raw material polyether polyol is not more than the upper limit above, the yield of the obtained polyether polyol tends to be enhanced.

Here, as the carbon number of the alcohol is smaller, the addition amount of water is likely to be reduced. For example, in the case of using methanol as the alcohol, the addition amount of water is preferably small, compared with the case of using ethanol. The reason therefor is because an alcohol having a small carbon number is hydrophilic and thus exhibits high solubility in water and low solubility in polyether polyol and consequently, the alcohol extraction efficiency to the water layer side having water as the main component is high. The addition amount of water affects the amount of discharged water and therefore, by using an alcohol having a small carbon number, the cost for waste water can likely be reduced.

The method for mixing the raw material polyether polyol, water and an alcohol is not particularly limited as long as it is a known method, but there is, for example, a method using a stirrer with a stirring blade, a method using an ultrasonic mixer, and a method of mixing a solution while controlling the raw material charging conditions. A method using a stirrer with a stirring blade is preferred.

The order of mixing the raw material polyether polyol, water and an alcohol is not particularly limited, but water may be added to a mixed solution of the raw material polyether polyol and an alcohol, or the raw material polyether polyol may be added to a mixed solution of water and an alcohol. The raw material polyether polyol for use in the present invention readily turns into a solid upon contact with water or at a low temperature since the number average molecular weight is high, and it is therefore preferable to add water to a mixed solution of an alcohol and a polyether polyol and stir the solution.

Among others, a method of adding the raw material polyether polyol to an alcohol heated at 20 to 50° C., mixing them under stirring to make a uniform solution, and further adding water, followed by stirring, is preferred so as to uniformly dissolve the raw material polyether polyol.

The temperature of the solution at the time of mixing is not particularly limited but in view of solubility of the raw material polyether polyol in an alcohol, the temperature is usually 20° C. or more, preferably 25° C. or more, more preferably 28° C. or more, still more preferably 30° C. or more, yet still more preferably 31° C. or more. On the other hand, the upper limit is usually 80° C. or less, preferably 70° C. or less, more preferably 60° C. or less, still more preferably 55° C. or less. When the temperature is not less than the lower limit value above, the polyether polyol tends to fully dissolve in an alcohol and be uniformly mixed. When the temperature is not more than the upper limit value above, an increase in molecular weight of the polyether polyol can be sufficiently achieved and at the same time, evaporation of the alcohol from the mixed solution can be prevented.

The mixing time when producing the mixed solution is not particularly limited but is usually from 0.1 to 10 hours, preferably from 0.2 to 5 hours, more preferably from 0.3 to 3 hours. If the mixing time is too short, the polyether polyol tends not to sufficiently dissolve in water and an alcohol, resulting in deterioration of separating property in the subsequent layer separation step. On the other hand, if the mixing time is too long, the productivity tends to decrease.

<Re: Separation Step>

The separation step as used in the present invention means a step from the time where mixing is stopped to the time where withdrawal of the upper or lower layer is completed. The method for bringing about layer separation of the mixed solution is not particularly limited as long as it is a known method, but usually, a method of stopping mixing and then leaving the solution to stand is used.

The temperature of the mixed solution in the separation step of the present invention is usually 20° C. or more, preferably 25° C. or more, more preferably 30° C. or more, still more preferably 31° C. or more, yet still more preferably 33° C. or more, and most preferably 35° C. or more, and the upper limit is usually 80° C. or less, preferably 70° C. or less, more preferably 65° C. or less, still more preferably 60° C. or less, yet still more preferably 58° C. or less, and most preferably less than 55° C. If the temperature at the time of layer separation is too low, respective layers are suspended, making it difficult to distinguish the interface therebetween, and the separating property deteriorates. On the other hand, if the temperature at the time of layer separation is too high, it is likely that since not only the distribution ratio of alcohol to upper layer/lower layer changes but also the solubility of polyether polyol in alcohol increases, the low-molecular-weight polyether polyol is also readily distributed to the lower layer having a high abundance of alcohol. Accordingly, if the temperature at the time of layer separation is too high, this is likely to raise a problem that the number average molecular weight of the polyether polyol contained in the lower layer is not sufficiently increased.

In the present invention, the standing time after stopping the mixing until starting the withdrawal in the separation step is usually 5 minutes or more, preferably 10 minutes or more, more preferably 20 minutes or more, still more preferably 30 minutes or more, and on the other hand, the upper limit is usually 10 hours or less, preferably 5 hours or less, more preferably 3 hours or less, still more preferably 2 hours or less. If the standing time in the separation step is too short, this is associated with a tendency that distribution of the low-molecular-weight polyether polyol to upper layer/lower layer does not adequately occur and an increase in the molecular weight of the polyether polyol recovered is not sufficiently achieved. On the other hand, if the standing time in the separation step is too long, mass transfer of the polyether polyol to the upper layer is likely to occur, resulting in deterioration of productivity.

In the present invention, details of the mechanism in which a polyether polyol having a high number average molecular weight is obtained by performing the separation step above are unclear, but a hypothesis is set forth below.

In the present invention, a mixed solution of the raw material polyether polyol, water and an alcohol is separated into upper layer/lower layer, and by distributing a low-molecular-weight polyether polyol to the upper layer side, a high-molecular-weight polyether polyol is acquired from the lower layer. In general, a polyether polyol having a higher molecular weight is more hydrophobic and is less likely to mix with water but dissolves in alcohol, and an alcohol having dissolved therein a polyether polyol dissolves in water to a certain concentration.

It is therefore believed that a polyether polyol with a low number average molecular weight dissolved in alcohol is distributed to the upper layer having a high water content percentage and a polyether polyol with a high number average molecular weight is distributed to the lower layer having a high alcohol content percentage.

In addition, the temperature at the time of layer separation is considered to affect the solubility of polyether polyol in alcohol.

As regards the raw material polyether polyol having a number average molecular weight of 2,500 or more for use in the present invention, it would appear that if the temperature at the time of layer separation is low, the solubility of polyether polyol in alcohol is inadequate and since respective layers consequently become cloudy, the interface can be hardly distinguished.

It is believed that setting to the layer separation temperature specified in the present invention enables increased solubility of polyether polyol in alcohol and in turn, enhanced transparency of each layer and in addition, provides an appropriate distribution ratio of alcohol to upper layer/lower layer, allowing a polyether polyol having a high number average molecular weight to be obtained from the lower layer.

<Other Steps>

In the present invention, after the separation step, for example, a solution distillation step of distilling off water and alcohol from the target layer and obtaining a polyether polyol may be included.

The solution distillation step is not particularly limited as long as it is a known method capable of separating water and alcohol, but in order to reduce the water amount in the polyether polyol, it is preferable to perform heating and removal by distillation under reduced pressure.

The solution distillation step is performed at a temperature of usually from 0 to 200° C., preferably from 20 to 180° C., still more preferably from 40 to 160° C., yet still more preferably from 50 to 150° C. If the temperature exceeds the upper limit above, quality deterioration such as coloring of the polyether polyol or production of an end-capping compound is likely to occur. If the temperature is less than the lower limit above, water or alcohol tends to remain in the polyether polyol without being sufficiently removed.

In the solution distillation step, the alcohol or water removal efficiency can be enhanced by blowing an inert gas into the solution containing polyether polyol. As the inert gas, nitrogen or argon is suitably used, and nitrogen is more preferred because of its inexpensiveness. Furthermore, by flowing an inert gas, an effect of preventing coloring of the polyether polyol at the time of distilling off the solvent can also be expected.

The content of a water-soluble acid compound in the polyether polyol after solution distillation is usually from 0.0001 to 0.1 wt %, preferably from 0.0002 to 0.01 wt %, more preferably from 0.0003 to 0.005 wt %. If the content of a water-soluble acid compound in the polyether polyol is too large, when the polyether polyol is used as a polyurethane raw material, the polymerization reaction rate may be changed, and this is an undesirable tendency.

<Number Average Molecular Weight of Polyether Polyol>

As regards the polyether polyol obtained by the production method of the present invention, a polyether polyol having a number average molecular weight higher by 300 or more, preferably by 400 or more, more preferably by 500 or more, still more preferably by 600 or more, than that of the raw material polyether polyol can be produced. Here, the number average molecular weight and weight average molecular weight as used in the present invention are values measured by the above-described method.

The number average molecular weight of the polyether polyol obtained by the production method of the present invention is 3,500 or more, preferably 3,600 or more, more preferably 3,700 or more, still more preferably 3,800 or more. On the other hand, the upper limit is usually 5,500 or less, preferably 4,600 or less, more preferably 4,500 or less, still more preferably 4,400 or less, yet still more preferably 4,300 or less. When the number average molecular weight of the polyether polyol is in the range above, a polyurethane or polyester elastomer formed using it can have excellent physical properties.

<Molecular Weight Distribution of Polyether Polyol>

By the production method of the present invention, a polyether polyol in which the molecular weight distribution (Mw/Mn) indicated by weight average molecular weight/number average molecular weight is narrow can be easily produced.

The molecular weight distribution of the polyether polyol obtained by the production method of the present invention is lower usually by 0.2 or more, preferably by 0.3 or more, than the molecular weight distribution of the raw material polyether polyol.

The molecular weight distribution of the polyether polyol obtained by the production method of the present invention is usually 3.0 or less, preferably 2.9 or less, more preferably 2.8 or less, still more preferably 2.7 or less, yet still more preferably 2.6 or less, particularly preferably 2.2 or less, more particularly preferably 2.15 or less, still more particularly preferably 2.10 or less, and most preferably 2.05 or less. On the other hand, the lower limit of the molecular weight distribution of the polyether polyol is not particularly limited but is usually 1.7 or more, preferably 1.8 or more, more preferably 1.9 or more, still more preferably 2.0 or more. If the molecular weight distribution of the polyether polyol obtained by the production method of the present invention exceeds the upper limit value above, when the polyether polyol is used as a polyurethane raw material, physical properties of the polyurethane produced tends to be reduced. If the molecular weight distribution of the polyether polyol is less than the lower limit value above, it is likely that the yield of the polyether polyol significantly decreases and the productivity deteriorates.

<Viscosity of Polyether Polyol>

The present invention is also characterized in that a polyether polyol having low viscosity can be produced, despite the high number average molecular weight. In the production method of the present invention, an increase in the molecular weight is achieved by removing the low-molecular-weight polyether polyol from the raw material polyether polyol, providing the characteristic feature that the abundance ratio of a high-molecular-weight form is lower than that in a polyether polyol having a number average molecular weight at the same level produced by a ring-opening polymerization reaction of cyclic ether and the viscosity is low.

For example, when PTMG having a number average molecular weight of about 4,000 is produced by ring-opening polymerization of THF by using THF as the cyclic ether and fluorosulfuric acid as the polymerization catalyst, the viscosity (40° C.) is about 9,000 mPa·s. On the other hand, when PTMG having a number average molecular weight of about 4,000 is produced by the production method of the present invention by using, as a raw material, PTMG having a number average molecular weight of about 3,000 produced by ring-opening polymerization similarly to the above, the viscosity (40° C.) of the obtained PTMG is about 4,500 mPa·s, and the viscosity is halved compared with that produced by ring-opening polymerization. When the viscosity of the polyether polyol is low, the handleability at the time of use as a raw material of polyurethane or polyester elastomer is enhanced.

[3] Polyurethane

The polyether polyol of the present invention is reacted with an isocyanate compound, a chain extender, etc., whereby a polyurethane can be produced.

The polyurethane of the present invention contains, as constituent units, a polyether polyol having a number average molecular weight of 3,000 to 5,500 and a molecular weight distribution of 1.7 to 3.0 and an isocyanate compound.

In the present invention, unless otherwise indicated, the polyurethane encompasses both a polyurethane and a polyurethane urea, which have conventionally been known to show similar physical properties.

Here, the difference in structural feature between the polyurethane and the polyurethane urea is that the polyurethane is a polymer in which the chain structure is formed mainly by a urethane bond, and the polyurethane urea is a polymer in which the chain structure is formed mainly by a urethane bond and a urea bond. The difference in terms of raw material is that the polyurethane is produced using a short-chain polyol having a carbon number of 10 or less as the chain extender and the polyurethane urea is produced using a polyamine compound as the chain extender.

<Isocyanate Compound>

The isocyanate compound usable as a polyurethane raw material is not particularly limited but includes, for example, an aromatic diisocyanate such as 2,4- or 2,6-tolylene diisocyanate, xylylene diisocyanate, 4,4'-diphenylmethane diisocyanate (MDI), 2,4'-MDI, paraphenylene diisocyanate, 1,5-naphthalene diisocyanate and tolidine diisocyanate; an aliphatic diisocyanate having an aromatic ring, such as α,α,α',α'-tetramethylxylylene diisocyanate; an aliphatic diisocyanate such as methylene diisocyanate, propylene diisocyanate, lysine diisocyanate, 2,2,4- or 2,4,4-trimethylhexamethylene diisocyanate and 1,6-hexamethylene diisocyanate; and an alicyclic diisocyanate such as 1,4-cyclohexane diisocyanate, methylcyclohexane diisocyanate (hydrogenated TDI), 1-isocyanato-3-isocyanatomethyl-3,5,5-trimethylcyclohexane (IPDI), 4,4'-dicyclohexylmethane diisocyanate and isopropylidenedicyclohexyl-4,4'-diisocyanate. One of these may be used alone, or two or more thereof may be used in combination.

The suitable isocyanate compound differs depending on the application of the polyurethane produced and, for example, in the application requiring weather resistance, such as synthetic/artificial leather skin layer or coating material, an aliphatic diisocyanate and/or an alicyclic diisocyanate are preferably used because of less yellowing due to light. Among others, in view of good physical properties and easy availability, 1,6-hexamethylene diisocyanate, 1-isocyanato-3-isocyanatomethyl-3,5,5-trimethylcyclohexane (IPDI), and 4,4'-dicyclohexylmethane diisocyanate are preferably used. On the other hand, in the application requiring strength, such as elastic fiber, it is preferable to use an aromatic diisocyanate having high cohesive force, and among others, in view of good physical properties and easy availability, tolylene diisocyanate (TDI) and diphenylmethane diisocyanate (MDI) are preferably used. In addition, the compound may be an isocyanate compound in which the NCO group is altered in part to urethane, urea, biuret, allophanate, carbodiimide, oxazolidone, amide, imide, etc. or may be an isomer thereof.

At the production of polyurethane, in the case of using an isocyanate compound, the amount of the compound used is usually from 0.1 to 5 equivalents, preferably from 0.8 to 2 equivalents, more preferably from 0.9 to 1.5 equivalents, still more preferably from 0.95 to 1.2 equivalents, yet still more preferably from 0.98 to 1.1 equivalents, per equivalent of the total amount of a hydroxyl group of the polyether polyol and a hydroxyl group and/or an amino group of the later-described chain extender used as needed and the later-described other polyols used as needed.

When the amount of the isocyanate compound used is in the range above, desirable physical properties tend to be easily obtained while preventing an unreacted isocyanate group from causing an unfavorable reaction such as cross-linking reaction. In addition, when the amount of the isocyanate compound used is in the range above, the molecular weight of polyurethane and polyurethane urea can be sufficiently increased, and the desirable performance tends to be easily exhibited.

The isocyanate compound disappears in part by reacting with water contained in the polyether polyol or polyurethane raw materials other than the isocyanate compound, such as the later-described chain extender used as needed, and an amount to make up for the disappearance may be added to the desirable amount of the isocyanate compound used. Specifically, the polyether polyol, a chain extender, etc. are measured for the water amount before being mixed with the isocyanate compound at the time of reaction, and an amount of an isocyanate compound having isocyanate groups corresponding to two times the molar number of the water is added to the predetermined use amount.

The mechanism in which an isocyanate group reacts with water and disappears is that an isocyanate group reacts with a water molecule to provide an amine compound and the amine compound further reacts with an isocyanate group to form a urea bond, resulting in disappearance of two isocyanate groups per one water molecule.

This loss may cause a shortage of the required isocyanate compound, making it impossible to obtain desired physical properties, and it is therefore effective that an isocyanate compound to make up for the amount corresponding to the water amount is added by the method described above.

<Chain Extender>

At the time of producing a polyurethane by using the polyether polyol of the present invention as a raw material, a chain extender may be used together with the polyether polyol and isocyanate compound described above.

The chain extender is classified mainly into a compound having a molecular weight of 500 or less and containing two or more hydroxyl groups, a compound containing two or more amino groups, and water. Of these, a short-chain polyol having a carbon number of 10 or less, specifically, a compound having two or more hydroxyl groups, is preferred for the polyurethane production, and a polyamine compound, specifically, a compound having two or more amino groups, is preferred for the polyurethane urea production.

At the time of producing a polyurethane by using the polyether polyol of the present invention as a raw material, it is preferable in view of physical properties to use a compound having a molecular weight (number average molecular weight) of 500 or less in combination as the chain extender, because rubber elasticity of a polyurethane elastomer is enhanced. Here, one of these chain extenders may be used alone, or two or more thereof may be used in combination.

The compound having two or more hydroxyl groups includes, for example, an aliphatic glycol such as ethylene glycol, diethylene glycol, triethylene glycol, propylene glycol, dipropylene glycol, tripropylene glycol, 1,3-propanediol, 2-methyl-1,3-propanediol, 2-methyl-2-propyl-1,3-propanediol, 2-butyl-2-ethyl-1,3-propanediol, 2-butyl-2-hexyl-1,3-propanediol, 1,2-butanediol, 1,3-butanediol, 1,4-butanediol, 2,3-butanediol, 1,5-pentanediol, 2-methyl-2,4-pentanediol, 3-methyl-1,5-pentanediol, 2,2,4-trimethyl-1,3-pentanediol, neopentyl glycol, 1,6-hexanediol, 2-ethyl-1,3-hexanediol, 2,5-dimethyl-2,5-hexanediol, 1,8-octanediol, 2-methyl-1,8-octanediol, 1,9-nonanediol and 1,10-decanediol; an alicyclic glycol such as bishydroxymethylcyclohexane; and an aromatic ring-containing glycol such as xylylene glycol and bishydroxyethoxybenzene. Of these, ethylene glycol, diethylene glycol, 1,3-propanediol, 1,4-butanediol, 3-methyl-1,5-pentanediol, neopentyl glycol, and 2-methyl-1,3-propanediol are preferred, and in view of excellent balance among physical properties of the obtained polyurethane, 1,4-butanediol is preferred.

The compound having two or more amino groups includes, for example, an aromatic diamine such as 2,4- or 2,6-tolylenediamine, xylylenediamine and 4,4'-diphenylmethanediamine; an aliphatic diamine such as ethylenediamine, 1,2-propylenediamine, 2,2-dimethyl-1,3-propanediamine, 1,3-pentanediamine, 2-methyl-1,5-pentanediamine, 2-butyl-2-ethyl-1,5-pentanediamine, 1,6-hexanediamine, 2,2,4- or 2,4,4-trimethylhexanediamine, 1,8-octanediamine, 1,9-nonanediamine and 1,10-decanediamine; and an alicyclic diamine such as 1-amino-3-aminomethyl-3,5,5-trimethylcyclohexane (IPDA), 4,4'-dicyclohexylmethanediamine (hydrogenated MDA), isopropylidenecyclohexyl-4,4'-diamine, 1,4-diaminocyclohexane and 1,3-bisaminomethylcyclohexane. Among these, ethylenediamine, 1,2-propylenediamine, 1,3-pentanediamine, 2-methyl-1,5-pentanediamine, 1-amino-3-aminomethyl-3,5,5-trimethylcyclohexane (IPDA), and 4,4'-dicyclohexylmethanediamine (hydrogenated MDA) are preferred.

As for these chain extenders, a biomass-resource-derived chain extender may also be used.

Assuming that the equivalent obtained by subtracting the hydroxyl equivalent of the polyether polyol from the equivalent of the isocyanate compound is 1, the amount of the chain extender used is usually 0.1 equivalents or more, preferably 0.5 equivalents or more, more preferably 0.8 equivalents or more, still more preferably 0.9 equivalents of more, and on the other hand, the upper limit is 5.0 equivalents or less, preferably 2.0 equivalents or less, more preferably 1.5 equivalents or less.

Setting the use amount of the chain extender to be not more than the upper limit above is associated with a tendency that the obtained polyurethane is prevented from becoming too hard, enabling having desirable properties, and easily dissolves in a solvent to facilitate processing and an unreacted chain extender is less likely to remain, resulting in stabilization of the physical stabilities of the obtained polyurethane. In addition, setting the use amount to be not less than the lower limit above is associated with a tendency that the obtained polyurethane is not too soft and can have sufficient strength and elasticity recovering performance or elasticity retaining performance and good high-temperature properties are obtained.

<Other Additives, Etc.>

In the present invention, at the time of polyurethane production, in addition to the polyether polyol and the isocyanate compound, a chain terminator, etc. having one active hydrogen group can be used, if desired, with the purpose of controlling the molecular weight of the polyurethane.

Examples of the chain terminator include an aliphatic monool having a hydroxyl group, such as ethanol, propanol, butanol and hexanol, and an aliphatic monoamine having an amino group, such as diethylamine, dibutylamine, n-butylamine, morpholine, monoethanolamine and diethanolamine. One of these may be used alone, or two or more thereof may be used in combination.

In addition, at the time of polyurethane production, a crosslinking agent may be used, if desired, with the purpose of enhancing the heat resistance or strength of the obtained polyurethane.

The number average molecular weight of the polytetramethylene ether glycol used for the production of the polyurethane of the present invention is from 3,000 to 5,500. The upper limit is preferably 5,000 or less, more preferably 4,800 or less, still more preferably 4,600 or less, and most preferably 4,500 or less, and on the other hand, the lower limit is preferably 3,200 or more, more preferably 3,400 or more, still more preferably 3,600 or more, and most preferably 3,800 or more.

If the number average molecular weight of the polytetramethylene ether glycol is too high, not only the viscosity of the polytetramethylene ether glycol becomes too high, making the handling very difficult, but also since the molecular mobility lowers due to an increased abundance of a high-molecular-weight form, the reactivity with an isocyanate compound is reduced to deteriorate the productivity. When the molecular weight of the polytetramethylene ether glycol is in the specified range, a polyurethane having excellent flexibility or elastic recovery can be obtained.

The lower limit of the molecular weight distribution of the polytetramethylene ether glycol used for the production of the polyurethane of the present invention is 1.7 or more, preferably 1.8 or more, more preferably 1.9 or more, still more preferably 2.0 or more, and the upper limit of the molecular weight distribution is 3.0 or less, preferably 2.9 or less, more preferably 2.8 or less, still more preferably 2.7 or less, yet still more preferably 2.6 or less. In the case of producing a polytetramethylene ether glycol having a molecular weight distribution not more than the lower limit above, setting of production conditions or refining conditions is difficult, and the productivity or production cost is therefore caused to worsen.

If the molecular weight distribution exceeds the upper limit above, not only the molecular mobility lowers due to an increased abundance of a high-molecular-weight form in the polytetramethylene ether glycol to reduce the reactivity with an isocyanate compound and in turn deteriorate the productivity but also a polyurethane having excellent flexibility or elastic recovery, which is an object of the present invention, cannot be produced.

When the molecular weight distribution is in the range above, the abundance of a high-molecular-weight form in the polytetramethylene ether glycol decreases to keep the viscosity below a certain value, facilitating the handling at the time of charging, etc., and the molecular mobility above a certain level is maintained to enhance the reactivity with an isocyanate compound, so that a polyurethane having excellent flexibility or elastic recovery can be produced with high productivity.

The polytetramethylene ether glycol having the number average molecular weight and molecular weight distribution in specific ranges, which is used for the production of the polyurethane of the present invention, can be produced by a conventionally known method or the above-described technique.

In the production of the polyurethane of the present invention, the reason why a polyurethane having excellent flexibility or elastic recovery can be produced with high productivity by using, as a polyurethane raw material, a polytetramethylene glycol having the number average molecular weight and molecular weight distribution in specific ranges, is unclear but can be presumed as follows.

In general, a polyurethane or a polyurethane urea is a block copolymer composed of a hard segment and a soft segment and in order to enhance the elastic recovery, a distinct phase separation is preferably created between these segments.

In order to enhance the phase separation between a hard segment and a soft segment, it is advantageous for the polytetramethylene ether glycol constituting the soft segment to have a higher molecular weight. Accordingly, when a polytetramethylene ether glycol having a number average molecular weight above a certain level is used as a polyurethane raw material, the physical properties of the polyurethane are improved. On the other hand, when the molecular weight of the polytetramethylene ether glycol is increased, the polytetramethylene ether glycol itself tends to crystallize. When the polytetramethylene ether glycol as a soft segment is crystallized, even if the phase separation is enhanced, the elastic recovery may deteriorate. In addition, the viscosity rises due to an increased abundance of a high-molecular-weight form, raising a concern that the handleability is reduced to make the productivity worse.

As a result of many studies, it has been found that even if the molecular weight of the polytetramethylene ether glycol is high, when the molecular weight distribution is kept below a certain value, the flexibility, elastic recovery, etc. can be improved while maintaining the productivity by suppressing increase in viscosity. More specifically, it is considered that an excessive abundance of a high-molecular-weight form can be reduced by keeping the molecular weight distribution below a certain level and since increase in viscosity of the polytetramethylene ether glycol or crystallization of the soft segment, which adversely affects the productivity or physical properties of polyurethane, are suppressed, the physical properties such as flexibility or elastic recovery exhibited in the case of using a polytetramethylene ether glycol having a high molecular weight can be maintained.

The viscosity of the polytetramethylene ether glycol used for the production of the polyurethane of the present invention, as measured at 40° C. by means of an E-type rotary viscometer, is usually 15,000 mPa·s or less, preferably 13,000 mPa·s or less, more preferably 11,000 mPa·s or less. When the viscosity is not more than the upper limit above, handling at the time of charging, etc. tends to be facilitated, leading to enhanced productivity.

<Production Method of Polyurethane>

In producing a polyurethane by using the polyether polyol of the present invention as a raw material, the production can be conducted in the absence of a solvent or in the coexistence of a solvent by using a polyether polyol and an isocyanate compound as main raw materials for the production, each in the above-described use amount, by all production methods employed experimentally/industrially in general. At the time of polyurethane production, a preferred embodiment is to produce a polyurethane by using a polyether polyol, an isocyanate compound, and a chain extender as raw materials.

The production method includes, for example, a method where the polyether polyol, the isocyanate compound and the chain extender are reacted at the same time (hereinafter, referred to as "one-step method"), a method where the polyether polyol and the isocyanate compound are reacted to prepare a prepolymer having an isocyanate group at both ends and the prepolymer is reacted with the chain extender (hereinafter, referred to as "isocyanate-terminated two-step method"), and a method where the polyether polyol and the isocyanate compound are reacted to prepare a prepolymer having a hydroxyl group at both ends and the prepolymer is reacted with an isocyanate compound (hereinafter, referred to as "hydroxyl group-terminated two-step method").

Among these, the isocyanate-terminated two-step method is a method passing through a step of previously reacting a polyester polyol with 1 equivalent or more of an isocyanate compound to prepare an intermediate capped at both ends with isocyanate, which corresponds to the soft segment of polyurethane. The two-step method is advantageous in that since a prepolymer is once prepared and then reacted with the chain extender, the molecular weight of the soft segment moiety is easily adjusted.

Above all, in the case where the chain extender is a diamine, the rate of reaction with an isocyanate group greatly differs between a hydroxyl group of the polyester polyol and an amino group of the diamine, and the polyurethane urea is therefore preferably produced by the two-step method.

[Physical Properties of Polyurethane]

The polyurethane of the present invention may be either in a solution state or in a solid state, and the existence form thereof is not limited.

The weight average molecular weight (Mw) of the polyurethane of the present invention as measured by gel permeation chromatography (GPC) varies depending on usage but is usually preferably from 10,000 to 1,000,000, more preferably from 50,000 to 500,000, still more preferably from 100,000 to 400,000, yet still more preferably from 130,000 to 300,000, in terms of standard polystyrene.

The amount of hard segment in the polyurethane of the present invention is not particularly limited but is usually from 1 to 80 wt %, preferably from 2 to 60 wt %, more preferably from 2 to 40 wt %, still more preferably from 3 to 20 wt %. When the amount of hard segment is in the range above, it is likely that the polyurethane readily exhibits sufficient flexibility or elastic recovery and in the case of using a solvent, easily dissolves to facilitate the processing. Furthermore, the polyurethane tends to be prevented from becoming too soft, be easy to process, and have sufficient strength or elastic performance.

The amount of hard segment as used in the present invention is a value determined by calculating the mass of the binding part between isocyanate and chain extender relative to the total mass, according to the following formula based on P. J. Flory, Journal of American Chemical Society, 58, 1877-1885 (1936).

$$\text{Amount of hard segment (\%)} = [(R-1)(Mdi+Mdc)/\{Mp+R \times di+(R-1) \times Mdc\}] \times 100$$

wherein

R=molar number of isocyanate compound/molar number of hydroxyl group of polyol such as polytetramethylene ether glycol, Mdi=number average molecular weight of isocyanate compound, Mdc=number average molecular weight of chain extender, and Mp=number average molecular weight of polyol such as polytetramethylene ether glycol.

[Polyurethane Mold]

The polyurethane in a solid state or a liquid state may be molded by a known method to provide a polyurethane mold.

In this case, the molding method and form thereof are not particularly limited as well, but the polyurethane can be molded into various forms such as sheet, film and fiber by a molding method such as extrusion molding and injection molding.

The polyurethane of the present invention and a polyurethane polymer solution thereof can be caused to exhibit a variety of properties. For example, they are used as a fiber, a film, a coating material, an adhesive, a functional part, etc. in a wide range of fields such as clothing, sanitary product, packaging, civil engineering, building, medical treatment, motor vehicle, household appliances and other industrial parts, in the form of, e.g., a resinous, rubbery or thermoplastic elastomeric material or in the state of, e.g., a solid or foam molded into various shapes or a liquid.

In particular, from the viewpoint of taking advantage of flexibility or elastic recovery, the polyurethane of the present invention is preferably used as a fiber or a film. Specific applications thereof include an elastic fiber for clothing, a medical treatment, a sanitary product, an artificial leather, a synthetic leather, etc.

<Polyurethane Film>

The thickness of a film using the polyurethane of the invention varies depending on the usage and is not particularly limited but is usually from 1 to 1,000 μm, preferably from 10 to 500 μm, more preferably from 10 to 100 μm. When the film thickness is set to be 1,000 μm or less, molding stability tends to be obtained. In addition, when the thickness is set to be 1 μm or more, it is likely that a pinhole is hardly formed and the film is resistant to blocking and easy to handle.

A film using the polyurethane of the present invention can be used preferably as a self-adhesive medical film, a sanitary material, a packaging material, a decorative film, other moisture-permeable materials, etc. Here, the film may be a film formed by applying the polyurethane onto a support such as fabric or nonwoven fabric, and in this case, the thickness may be further smaller than 1 μm.

The production method of a film using the polyurethane of the present invention is not particularly limited, and a conventionally known method may be used. The method includes, for example, a wet film formation method in which a polyurethane solution is applied or cast on a support or release material and the solvent and other soluble substances are extracted in a coagulation bath, and a dry film formation method in which a polyurethane solution is applied or cast on a support or release material and the solvent is removed by heating, pressure reduction, etc.

Although the support used at the time of film formation is not particularly limited, a polyethylene film, a polypropylene film, glass, a metal, a release agent-coated paper or fabric, etc. are used. The coating method is not particularly limited, and any known method such as knife coater, roll coater, spin coater and gravure coater may be used.

The drying temperature may be arbitrarily set according to the kind of solvent, the ability of dryer, etc. and is not particularly limited as long as it is in a temperature range where insufficient drying or abrupt solvent removal does not occur, but the temperature is usually from room temperature to 300° C., preferably from 60 to 200° C.

<Polyurethane Fiber>

Physical properties of a polyurethane film have a very good correlation with those of a polyurethane fiber, and physical properties obtained by a film test, etc. often show the same tendency also in the fiber. A fiber using the polyurethane of the present invention is excellent in the stretch recovery, elasticity, hydrolysis resistance, light fastness, oxidation resistance, oil resistance, processability, etc.

A fiber using the polyurethane of the present invention is preferably used in the applications, for example, legwear such as stocking and legwarmer, a panty, a diaper cover, a disposable diaper, sportswear, underwear, hosiery, a highly fashionable stretch garment, swimwear, and a leotard.

Excellent moisture permeability of a fiber using the polyurethane of the present invention is characterized in that when the fiber is used for a garment, the garment is less stuffy and feels comfortable to wear. In addition, the feature of being low in the coefficient of stress fluctuation or in modulus is characterized, for example, in that when worn on a body as a garment, the garment allows for passing through the sleeves with a small force and is extremely easy even for a child or an aged person to dress/undress.

Furthermore, the fiber has good fitting feel and conformability to movement and therefore, can be used in sportswear and more fashionable clothing applications. Moreover, because of a high elasticity retention rate in a repetitive extension test, the fiber is also characterized in that the elastic performance thereof is less likely to be impaired even when used repeatedly.

<Artificial Leather/Synthetic Leather>

An artificial or synthetic leather as one example of the representative application of the polyurethane of the present invention is described in detail below.

An artificial or synthetic leather has, as major constituent elements, a base cloth, an adhesive layer, and a skin layer. The skin layer is composed of a skin layer blend solution obtained by mixing the polyurethane of the present invention with other resins, an antioxidant, an ultraviolet absorber, etc. to prepare a polyurethane solution, and mixing the solution with a colorant, an organic solvent, etc. A hydrolysis inhibitor, a pigment, a dye, a flame retardant, a filler, a crosslinking agent, etc. can be added, if desired, to the polyurethane solution.

Other resins include, for example, a polyurethane except for the polyurethane of the present invention, a poly(meth)acrylic resin, a vinyl chloride-vinyl acetate-based copolymer, a vinyl chloride-vinyl propionate-based copolymer, a polyvinyl butyral-based resin, a cellulose-based resin, a polyester resin, an epoxy resin, a phenoxy resin, and a polyamide resin.

The crosslinking agent includes, for example, a polyisocyanate compound such as organic polyisocyanate, crude MDI, TDI adduct of trimethylolpropane, and triphenylmethane isocyanate.

The base cloth includes, for example, rayon, a napped cotton cloth, a knitted cloth, and a nylon tricot cloth. The adhesive includes, for example, a two-pack polyurethane composed of a polyurethane, a polyisocyanate compound and a catalyst.

The polyisocyanate compound includes, for example, a TDI adduct of trimethylolpropane. The catalyst includes, for example, an amine-based or tin-based catalyst.

In order to produce a synthetic leather using the polyurethane of the present invention, for example, first, the polyurethane of the present invention is mixed with other resins, etc. to prepare a polyurethane solution, and the solution is then mixed with a colorant, etc. to prepare a skin layer blend solution. Subsequently, this blend solution is applied onto a release paper and dried, an adhesive is further applied thereon to form an adhesive layer, a napped cloth, etc. is laminated thereto and dried, and after aging at room temperature for a few days, the release paper is separated, whereby an artificial leather•synthetic leather is obtained.

The produced artificial leather•synthetic leather can be used for automotive interior materials, furniture, clothing, shoes, bags, etc.

[4] Polyester Elastomer

In the present invention, the polyester elastomer consists of the polyether polyol as a soft segment, and a hard segment other than that. The hard segment includes, for example, a polyester structure having a dicarboxylic acid unit and a diol unit as main repeating units.

Here, the polyether polyol of the present invention is not encompassed by a diol unit.

<Dicarboxylic Acid>

The dicarboxylic acid component includes a saturated aliphatic dicarboxylic acid exemplified by terephthalic acid, succinic acid, glutaric acid, adipic acid, azelaic acid, sebacic acid, decanedicarboxylic acid, dodecanedicarboxylic acid, 1,3-cyclobutanedicarboxylic acid, 1,4-cyclohexanedicarboxylic acid and dimer acid, or an ester-forming derivative thereof; an unsaturated aliphatic dicarboxylic acid exemplified by fumaric acid, maleic acid and itaconic acid, or an ester-forming derivative thereof; and an aromatic dicarboxylic acid exemplified by phthalic acid, isophthalic acid, 5-(alkali metal)sulfoisophthalic acid, 2,6-naphthalenedicarboxylic acid and 4,4'-biphenyldicarboxylic acid, or an ester-forming derivative thereof. Usually, a compound having a molecular weight of 400 or less is used as the dicarboxylic acid component, and terephthalic acid is preferably used in view of physical properties and heat resistance of the obtained polyester elastomer.

<Diol>

The diol component includes an aliphatic glycol exemplified by ethylene glycol, 1,4-butanediol, 1,2-propylene glycol, 1,3-propylene glycol, diethylene glycol, triethylene glycol, tetraethylene glycol, 1,4-butylene glycol, 1,5-pentanediol, neopentyl glycol, 1,4-hexanediol, 1,4-cyclohexanedimethanol, polyethylene glycol, polytrimethylene glycol and polytetramethylene glycol, hydroquinone, 4,4'-dihydroxybisphenol, 1,4-bis((3-hydroxyethoxy)benzene, bisphenol A, 2,5-naphthalenediol, and a glycol formed by adding ethylene oxide to the glycol above. In view of physical properties of the obtained polyester elastomer, 1,4-butanediol is preferably used.

By using the polyether polyol of the present invention as a raw material, a polyester elastomer having high flexibility and low hardness can be obtained.

The proportion of the polyether polyol in the polyester elastomer is usually from 5 to 50 mass %, preferably from 10 to 40 mass %, more preferably from 15 to 35 mass %. When the amount of soft segment is in the range above, a polyester elastomer having high flexibility, low hardness and a high melting point tends to be obtained.

<Production Method of Polyester Polyol>

The production method of a polyester elastomer is described through an example. As for the polyester elastomer resin composition in the present invention, a dicarboxylic acid component and a diol component are subjected to an esterification reaction or a transesterification reaction with a polyalkylene glycol, and a polycondensation reaction is then performed, whereby the polyester elastomer of the present invention can be produced.

Specifically, the polycondensation reaction is performed usually under reduced pressure of approximately from 0.01 to 10 hPa at a temperature of 220 to 280° C. until a polyester having a predetermined limiting viscosity is obtained. In addition, the polycondensation reaction is performed in the presence of a catalyst, and as the catalyst, other than a metal compound conventionally used in general, such as antimony, germanium, tin, titanium, zinc, aluminum, magnesium, potassium, calcium, sodium, manganese and cobalt, an organic sulfonic acid compound such as sulfosalicylic acid and o-sulfobenzoic anhydride, may be used.

After reaching a predetermined limiting viscosity in the polycondensation reaction, the polyester is withdrawn in a stand form, cooled, and cut into chip shape.

EXAMPLES

The present invention is described more specifically below by referring to Examples, but the present invention is not limited by the following Examples as long as the gist of the present invention is observed.

Test Example 1

The analyses and measurements in Test Example 1 are performed by the following methods.

<Number Average Molecular Weight and Molecular Weight Distribution of Polyether Polyol (GPC)>

A tetrahydrofuran solution of polytetramethylene ether glycol was prepared and then measured for molecular weights by using a GPC apparatus [product name: "HLC-8220", manufactured by Tosoh Corp., column: TskgelSuper HZM-N (four columns)], and a value (MW/Mn) obtained by dividing the weight average molecular weight (Mw) by the number average molecular weight (Mn) was defined as the molecular weight distribution of polytetramethylene ether glycol. For the calibration of GPC, a POLYTETRAHYDROFURAN Calibration kit of POLYMER LABORATORIES, UK was used.

<Viscosity of Polyether Polyol>

A value obtained by measuring 0.4 ml of polytetramethylene ether glycol by means of an E-type rotary viscometer (VISCOMETER TV-22L, manufactured by Toki Sangyo Co., Ltd., rotor: 3° R14) set at 40° C. was defined as the viscosity of polytetramethylene ether glycol.

<Amount of Hard Segment of Polyurethane>

The amount of hard segment of the obtained polyurethane was determined by calculating the mass of the binding part between isocyanate and chain extender, relative to the total mass, according to the following formula based on P. J. Flory, Journal of American Chemical Society, 58, 1877-1885 (1936).

Amount of hard segment (%)=[$(R-1)(Mdi+Mdc)$/ $\{Mp+R \times Mdi+(R-1) \times Mdc\}$]×100 wherein

R=molar number of isocyanate compound/molar number of hydroxyl group of polyol such as polytetramethylene ether glycol, Mdi=number average molecular weight of isocyanate compound, Mdc=number average molecular weight of chain extender, and Mp=number average molecular weight of polyol such as polytetramethylene ether glycol.

<Molecular Weight of Polyurethane>

As for the molecular weight of polyurethane, an N,N-dimethylacetamide solution was prepared to afford a polyurethane concentration of 0.14 mass % and measured for the weight average molecular weight (Mw) and molecular weight distribution (Mw/Mn), in terms of standard polystyrene, by using a GPC apparatus [manufactured by Tosoh Corporation, product name: "HLC-8220" (column: Tskgel-GMH-XL, two columns), a solution prepared by dissolving 2.6 g of lithium bromide in 1 L of dimethylacetamide was used for eluent].

<Tensile Properties>

The polyurethane solution produced was applied onto a glass plate by means of a 500-μm applicator and dried at 60° C. for 15 hours. The obtained polyurethane film was cut into a strip having a width of 10 mm, a length of 100 mm and a thickness of 50 to 100 μm and measured for the tensile breaking strength, tensile breaking elongation, and modulus at elongation of 100% and 300% by using a tensile tester (Tensilon UTM-III-100, manufactured by Orientec, Co. Ltd.) under the conditions of a chuck-to-chuck distance of 50 mm, a tensile speed of 500 mm/min and a temperature of 23° C. (relative humidity: 55%). Each measurement was performed at 5 to 10 points per one sample, and the average value thereof was employed. Lower modulus at 100% and 300% indicates higher flexibility, and larger breaking strength or breaking elongation indicates higher durability for stretching.

<Elasticity Retention Rate and Residual Strain>

The polyurethane solution produced was applied onto a glass plate by means of a 500-μm applicator and dried at 60° C. for 15 hours, and the obtained polyurethane film was cut into a strip having a width of 10 mm, a length of 100 mm and a thickness of 50 to 100 μm. The strip was stretched to 300% under the conditions of a temperature of 23° C. (relative humidity: 55%), a chuck-to-chuck distance of 50 mm, and a tensile speed of 500 mm/min and subsequently contracted to the original length at a speed of 500 mm/min, and this operation was repeated twice.

Assuming that the stress at 150% elongation in first stretching is H1 and the stress at 150% elongation in second stretching is H2, H2/H1 was determined. As the numerical value of H2/H1 is closer to 1, the elasticity retention rate is more excellent.

Furthermore, the elongation degree at a point where the stress in second stretching rises is defined as the residual stain. As the residual strain is closer to 0, the elastic recovery is more excellent.

<Production of Polytetramethylene Ether Glycol 1 (PTMG-1)>

A methanol solution of PTMG was prepared by adding 500 g of methanol to 250 g of "PTMG #3000", trade name, produced by Mitsubishi Chemical Corporation (number average molecular weight: 2,683, Mw/Mn: 2.60, viscosity: 3,380 mPa·s). The methanol solution of PTMG was added to a vessel (a 1,000 mL separable flask with a jacket) and after adding desalted water (250 g), the solution was mixed by stirring at a jacket temperature of 50° C. for 1 hour.

The solution was then left standing for 1 hour while keeping the jacket temperature at 50° C. The mixed solution after standing was separated into two layers of upper layer and lower layer, and the slightly clouded lower layer was withdrawn into a 500 mL glass vessel. The vessel was set in an oil bath, and bubbling with nitrogen gas was performed to remove methanol and water by distillation for 1 hour under the conditions of normal pressure and a bath temperature of 100° C.

Thereafter, the remaining solvent was distilled off by reducing the pressure to 10 mmHg while keeping the bath temperature at 100° C., and 208 g (yield: 83.2%) of Polytetramethylene Ether Glycol 1 was thereby obtained. The obtained PTMG was subjected to GPC analysis, and the number average molecular weight and molecular weight distribution were calculated, as a result, the number average molecular weight and Mw/Mn were 3,697 and 2.00, respectively. The viscosity as measured by an E-type rotary viscometer set to 40° C. was 3,870 mPa·s.

<Production of Polytetramethylene Ether Glycol 2 (PTMG-2)>

A methanol solution of PTMG was prepared by adding 625 g of methanol to 250 g of "PTMG #3000", trade name, produced by Mitsubishi Chemical Corporation (number average molecular weight: 2,683, Mw/Mn: 2.60, viscosity: 3,380 mPa·s). The methanol solution of PTMG was added to a vessel (a 1,000 mL separable flask with a jacket) and after adding desalted water (250 g), the solution was mixed by stirring at a jacket temperature of 50° C. for 1 hour.

The solution was then left standing for 1 hour while keeping the jacket temperature at 50° C. The mixed solution after standing was separated into two layers of upper layer and lower layer, and the slightly clouded lower layer was withdrawn into a 500 mL glass vessel. The vessel was set in an oil bath, and bubbling with nitrogen gas was performed to remove methanol and water by distillation for 1 hour under the conditions of normal pressure and a bath temperature of 100° C.

Thereafter, the remaining solvent was distilled off by reducing the pressure to 10 mmHg while keeping the bath temperature at 100° C., and Polytetramethylene Ether Glycol 2 was thereby obtained. The obtained PTMG was subjected to GPC analysis, and the number average molecular weight and molecular weight distribution were calculated, as a result, the number average molecular weight and Mw/Mn were 4,051 and 1.90, respectively.

<Production of Polytetramethylene Ether Glycol 3 (PTMG-3)>

A polymerization reactor (a 500 mL separable flask with a jacket) was added with 600 g of THF, further added with 14.4 g of fluorosulfuric acid as a ring-opening polymerization reaction catalyst, and heated at 45° C. for 5 hours to perform a ring-opening polymerization reaction.

After the completion of ring-opening polymerization reaction, the polymerization reaction solution was put into a Hastelloy-made hydrolysis tank having charged therein 630 g of desalted water, and allowed to undergo hydrolysis at 90° C. for 2 hours. The remaining oil phase was neutralized by adding 6 g of hydrated lime and 18 g of desalted water.

In order to separate unreacted THF from the reaction solution, simple distillation was performed for 20 minutes under the conditions of normal pressure and a temperature of 140° C. Thereafter, 480 g of toluene was added to the remaining reaction solution, and simple distillation was performed for 20 minutes under the conditions of normal pressure and a temperature of 150° C. to effect dehydration.

Subsequently, 5.6 g of diatomaceous earth (name of product: Radiolite, produced by Showa Chemical Industry Co., Ltd.) was added as a filter aid to the reaction solution above, and pressure filtration was conducted at a filtration pressure of 0.2 MPa by means of an SUS-made pressure filtration device (using a PTFE-made membrane filter having an opening size of 0.5 μm).

Simple distillation of the finally obtained clear filtrate was performed for 1 hour under the conditions of a pressure of 3 mmHg and a temperature of 140° C. to remove toluene and obtain 312.5 g (yield: 52.1%) of Polytetramethylene Ether Glycol 3. The obtained PTMG was subjected to GPC analysis, and the number average molecular weight and molecular weight distribution were calculated, as a result, the number average molecular weight and Mw/Mn were 3,777 and 2.58, respectively. The viscosity as measured by an E-type rotary viscometer set to 40° C. was 9,100 mPa·s.

<Production of Polytetramethylene Ether Glycol 4 (PTMG4)>

A methanol solution of PTMG was prepared by adding 500 g of methanol to 250 g of "PTMG #2000", trade name, produced by Mitsubishi Chemical Corporation (number average molecular weight: 1,958, Mw/Mn: 2.20, viscosity: 1,430 mPa·s). The methanol solution of PTMG was added to a vessel (a 1,000 mL separable flask with a jacket) and after adding desalted water (250 g), the solution was mixed by stirring at a jacket temperature of 50° C. for 1 hour.

The solution was then left standing for 1 hour while keeping the jacket temperature at 50° C. The mixed solution after standing was separated into two layers of upper layer and lower layer, and the slightly clouded lower layer was withdrawn into a 500 mL glass vessel. The vessel was set in an oil bath, and bubbling with nitrogen gas was performed to remove methanol and water by distillation for 1 hour under the conditions of normal pressure and a bath temperature of 100° C.

Thereafter, the remaining solvent was distilled off by reducing the pressure to 10 mmHg while keeping the bath temperature at 100° C., and Polytetramethylene Ether Glycol 4 was thereby obtained. The obtained PTMG was subjected to GPC analysis, and the number average molecular weight and molecular weight distribution were calculated, as a result, the number average molecular weight and Mw/Mn were 2,833 and 1.90, respectively.

<Production of Polytetramethylene Ether Glycol 5 (PTMG5)>

"PTMG #3000", trade name, produced by Mitsubishi Chemical Corporation (number average molecular weight: 2,683, Mw/Mn: 2.60, viscosity: 3,380 mPa·s) was used as Polytetramethylene Ether Glycol 5.

TABLE 1

| Analysis Item | PTMG-1 | PTMG-2 | PTMG-3 | PTMG-4 | PTMG-5 |
|---|---|---|---|---|---|
| Mn (GPC) | 3697 | 4051 | 3777 | 2833 | 2683 |
| Mw/Mn | 2.00 | 1.90 | 2.58 | 1.90 | 2.60 |
| Viscosity (mPa · s/ 40° C.) | 3870 | — | 9100 | — | 3380 |

Example 1-1

<Polymerization of Polyurethane Urea>

A separable flask (volume: 1 L) was added with 100.2 g of Polytetramethylene Ether Glycol 1 produced above and previously heated at 45° C., and 12.42 g of 4,4'-diphenylmethane diisocyanate (hereinafter, sometimes simply referred to as "MDI") previously heated at 45° C. such that the reaction equivalent ratio of isocyanate group/hydroxyl group (hereinafter, sometimes simply referred to as "NCO/OH ratio") becomes 1.80.

The flask was set in an oil bath at 45° C., and this timing is taken as a reaction starting point (reaction time: 0 h). Under stirring with an anchor-type stirring blade in nitrogen atmosphere, the temperature of the oil bath was raised to 75° C. over 1 hour, and the reaction was performed at 75° C. while confirming the progress of a urethanation reaction.

The reaction rate of NCO was confirmed by reacting the remaining NCO group with an excessive amount of dibutylamine and back-titrating the remaining dibutylamine with hydrochloric acid, and the reaction rate after 6.5 hours was confirmed to be 95.0%. The oil bath was then removed, and 142.56 g of N,N-dimethylacetamide (hereinafter, sometimes simply referred to as "DMAc", produced by Kanto Chemical Co., Inc.) was added to the flask to afford a polymer concentration of 40 mass % and dissolved by stirring at room temperature to prepare a polyurethane prepolymer solution.

Subsequently, 223.1 g of the polyurethane prepolymer solution above was cooled and held at 10° C., and on the other hand, as the chain extender, 0.86 g of ethylenediamine (hereinafter, sometimes simply referred to as "EDA") and 0.31 g of diethylamine (hereinafter, sometimes simply referred to as "DEA") were dissolved in 111.7 g of DMAc. To this DMAc solution, the polyurethane prepolymer solution cooled and held at 10° C. was added under stirring at high speed. After the addition, while keeping stirring, a mixed solution of 0.11 g of DEA and 116.64 g of DMAc was further added to perform an end-capping reaction and thereby obtain a polyurethane urea/DMAc solution having a polymer concentration of 20 mass %.

In the obtained polyurethane, the weight average molecular weight was 187,000, the molecular weight distribution was 2.42, and the amount of hard segment was 5.6 wt %.

Example 1-2

A polyurethane urea DMAc solution having a polymer concentration of 20 mass % was obtained by performing the same operation as in Example 1-1 except for using Polytetramethylene Ether Glycol 2 produced above and changing the charge amount as shown in Table 2, and prepolymer polymerization was then performed to obtain a polyurethane.

In the obtained polyurethane, the weight average molecular weight was 198,000, the molecular weight distribution was 2.47, and the amount of hard segment was 5.5 wt %.

Comparative Example 1-1

A polyurethane urea DMAc solution having a polymer concentration of 20 mass % was obtained by performing the same operation as in Example 1-1 except for using Polytetramethylene Ether Glycol 3 produced above and changing the charge amount as shown in Table 2. The reaction completing time of prepolymer polymerization was 5.5 hours, and the NCO reaction rate was 96.5%.

In the obtained polyurethane, the weight average molecular weight was 168,000, the molecular weight distribution was 2.26, and the amount of hard segment was 5.3 wt %.

Comparative Example 1-2

A polyurethane urea DMAc solution having a polymer concentration of 20 mass % was obtained by performing the same operation as in Example 1-1 except for using Polytetramethylene Ether Glycol 4 produced above and changing the charge amount as shown in Table 2, and prepolymer polymerization was then performed to obtain a polyurethane.

In the obtained polyurethane, the weight average molecular weight was 192,000, the molecular weight distribution was 2.50, and the amount of hard segment was 7.5 wt %.

Reference Example 1-1

A polyurethane urea DMAc solution having a polymer concentration of 20 mass % was obtained by performing the same operation as in Example 1-1 except for using Polytetramethylene Ether Glycol 5 and changing the charge amount as shown in Table 2. The reaction completing time of prepolymer polymerization reaction was 5.0 hours, and the NCO reaction rate was 96.8%.

In the obtained polyurethane, the weight average molecular weight was 155,000, the molecular weight distribution was 2.24, and the amount of hard segment was 7.0 wt %.

The raw-material charging conditions at the time of polyurethane production are shown in Table 2 below, and the number average molecular weight, molecular weight distribution and amount of hard segment in the obtained polyurethane are shown in Table 3.

TABLE 2

(unit: g)

| Step | Law Material | Example 1-1 | Example 1-2 | Comparative Example 1-1 | Comparative Example 1-2 | Reference Example 1-1 |
|---|---|---|---|---|---|---|
| Prepolymer-forming reaction | PTMG-1 | 100.2 | — | — | — | — |
| | PTMG-2 | — | 100.1 | — | — | — |
| | PTMG-3 | — | — | 100.1 | — | — |
| | PTMG-4 | — | — | — | 100 | — |
| | PTMG-5 | — | — | — | — | 100.5 |
| | MDI | 12.4 | 11.4 | 11.9 | 16.0 | 16.0 |
| Preparation of polyurethane prepolymer solution | polyurethane prepolymer | 95.3 | 97.8 | 88.9 | 104.5 | 107.2 |
| | DMAc | 142.6 | 146.7 | 133.6 | 156.8 | 159.6 |
| Chain extension reaction | prepolymer solution | 223.1 | 241.0 | 214.2 | 254.7 | 251.1 |
| | EDA | 0.86 | 0.86 | 0.85 | 1.23 | 1.03 |
| | DEA | 0.31 | 0.36 | 0.26 | 0.44 | 0.39 |
| | DMAc | 111.7 | 111.9 | 104.6 | 162.7 | 137.0 |
| End-capping reaction | DEA | 0.11 | 0.18 | 0.13 | 0.16 | 0.14 |
| | DMAc | 116.6 | 135.3 | 114.0 | 99.9 | 122.3 |

TABLE 3

| | Example 1-1 | Example 1-2 | Comparative Example 1-1 | Comparative Example 1-2 | Reference Example 1-1 |
|---|---|---|---|---|---|
| Amount of hard segment (wt %) | 5.6 | 5.5 | 5.3 | 7.5 | 7.0 |
| Mw (GPC) | 187000 | 198000 | 168000 | 192000 | 155000 |
| Mw/Mn | 2.42 | 2.47 | 2.26 | 2.5 | 2.24 |

[Evaluation Results of Physical Properties of Polyurethane Urea Film]

A DMAc solution of the obtained polyurethane urea was formed into a film and measured for physical properties, and the results are shown in Table 4.

TABLE 4

| | | Example 1-1 | Example 1-2 | Comparative Example 1-1 | Comparative Example 1-2 | Reference Example 1-1 |
|---|---|---|---|---|---|---|
| Tensile test | Modulus at elongation of 100% (MPa) | 2.0 | 1.9 | 2.5 | 2.7 | 2.8 |
| | Modulus at elongation of 300% (MPa) | 5.4 | 4.7 | 5.8 | 6.7 | 7.8 |
| | Breaking strength (MPa) | 60 | 53 | 60 | 50 | 73 |
| | Breaking elongation (%) | 853 | 840 | 860 | 807 | 757 |
| Elastic recovery test | H2/H1 | 0.73 | 0.77 | 0.73 | 0.63 | 0.66 |
| | Residual strain (%) | 5 | 7 | 9 | 11 | 11 |

As seen from Table 4, in the polyurethanes of Examples 1-1 and 1-2, the breaking strength and braking elongation are sufficiently high and as compared with Comparative Examples 1-1 and 1-2 and Reference Example 1-1, the modulus at 100% elongation is low, revealing high flexibility. It is also seen that in the polyurethane of Example 1-1, the value of H2/H1 is close to 1, revealing high elasticity retention rate, and since the value of residual strain is low, elastic recovery is excellent in particular.

Test Example 2

The measurements and evaluations in Test Example 2 are performed by the following methods.
<Method for Measuring Number Average Molecular Weight and Weight Average Molecular Weight>
The molecular weight was measured by the same method as in Test Example 1.
<Separating Property>
The separating property in the separation step was confirmed by observing the interface between upper layer and lower layer. Whether the separating property is good or not was judged according to the following criteria.
A: The interface between upper layer and lower can be distinctly confirmed.
C: The entire mixed solution is turbid, and the interface between upper layer and lower layer cannot be distinguished.
<Yield>
The yield was calculated according to the following formula:

Yield (%)=(weight of polyether polyol obtained by distilling off solvent from lower layer/weight of raw material polyether polyol)×100

Example 2-1

A methanol solution of PTMG was prepared by adding 500 g of methanol to 250 g of PTMG (trade name: "PTMG #3000", produced by Mitsubishi Chemical Corporation, number average molecular weight: 2,750, Mw/Mn: 2.44). The methanol solution of PTMG was added to a vessel (a 1,000 mL separable flask with a jacket) and after adding desalted water (250 g), the solution was mixed by stirring at a jacket temperature of 40° C. for 1 hour.
The solution was then left standing for 1 hour while keeping the jacket temperature at 40° C. The mixed solution after standing was separated into two layers of upper layer and lower layer, and the slightly clouded lower layer was withdrawn into a 500 mL glass vessel. The vessel was set in an oil bath, and bubbling with nitrogen gas was performed to remove methanol and water by distillation for 1 hour under the conditions of normal pressure and a bath temperature of 100° C.
Thereafter, the remaining solvent was distilled off by reducing the pressure to 10 mmHg while keeping the bath temperature at 100° C., and 194.8 g (yield: 77.9%) of PTMG was thereby obtained. The obtained PTMG was subjected to GPC analysis, and the number average molecular weight and molecular weight distribution were calculated, as a result, the number average molecular weight and Mw/Mn were 3,640 (increased by 890 relative to raw material polyether polyol) and 2.04 (decreased by 0.40 relative to raw material polyether polyol), respectively.

Example 2-2

A polyether polyol was produced by the same method as in Example 2-1 except for changing the jacket temperature during stirring as well as at the time of layer separation to 50° C. The mixed solution after standing was separated into two layers of upper layer and lower layer, and the lower layer was slightly clouded. The yield was 83.2% and in the obtained PTMG, the number average molecular weight and Mw/Mn were 3,700 (increased by 950 relative to raw material polyether polyol) and 2.00 (decreased by 0.44 relative to raw material polyether polyol), respectively.

Example 2-3

A polyether polyol was produced by the same method as in Example 2-1 except for changing the jacket temperature during stirring as well as at the time of layer separation to 60° C. The mixed solution after standing was separated into two layers of upper layer and lower layer, and the lower layer was slightly clouded. The yield was 80.4% and in the obtained PTMG, the number average molecular weight and Mw/Mn were 3,440 (increased by 690 relative to raw material polyether polyol) and 2.11 (decreased by 0.33 relative to raw material polyether polyol), respectively.

Example 2-4

A polyether polyol was produced by the same method as in Example 2-2 except for adding 0.0309 g of an aqueous 85 wt % phosphoric acid solution. Compared with Examples 2-1 to 2-3 in which an inorganic acid was not added, the transparency of each layer was enhanced, and the interface between upper layer and lower layer was very easily recognizable. The yield was 82.0% and in the obtained PTMQ the number average molecular weight and Mw/Mn were 3,930 (increased by 1,180 relative to raw material polyether polyol) and 1.90 (decreased by 0.54 relative to raw material polyether polyol), respectively.

Example 2-5

A polyether polyol was produced by the same method as in Example 2-2 except for adding 0.0365 g of concentrated sulfuric acid. Compared with Examples 2-1 to 2-3 in which an inorganic acid was not added, the transparency of each layer was enhanced, and the interface between upper layer and lower layer was very easily recognizable. The yield was 82.0% and in the obtained PTMG, the number average molecular weight and Mw/Mn were 4,050 (increased by 1,300 relative to raw material polyether polyol) and 1.89 (decreased by 0.55 relative to raw material polyether polyol), respectively.

Comparative Example 2-1

A polyether polyol was produced by the same method as in Example 2-1 except for changing the jacket temperature during stirring as well as at the time of layer separation to 20° C. The entire evaluation solution was turbid, and the interface between upper layer and lower layer could not be distinguished. The yield was 68.4% and in the obtained PTMG, the number average molecular weight and Mw/Mn were 4,090 (increased by 1,340 relative to raw material polyether polyol) and 1.87 (decreased by 0.57 relative to raw material polyether polyol), respectively.

TABLE 5

| | Composition of Reaction Solution (parts by weight) | | | | | Temperature of Mixed Solution at Oil-Water Separation (° C.) | Evaluation Results | | | | |
|---|---|---|---|---|---|---|---|---|---|---|---|
| | | | | Other Components | | | | Transparency of Lower Layer | Yield (%) | Number Average Molecular Weight | Molecular Weight Distribution |
| | PTMG | Methanol | Water | Kind | Addition Amount | | Separating Property | | | | |
| Comparative Example 2-1 | 100 | 200 | 100 | — | — | 20 | C | cloudy | 68 | 4090 | 1.9 |
| Example 2-1 | 100 | 200 | 100 | — | — | 40 | A | slightly cloudy | 78 | 3640 | 2.0 |
| Example 2-2 | 100 | 200 | 100 | — | — | 50 | A | slightly cloudy | 83 | 3700 | 2.0 |
| Example 2-3 | 100 | 200 | 100 | — | — | 60 | A | slightly cloudy | 80 | 3440 | 2.1 |
| Example 2-4 | 100 | 200 | 100 | 85 wt % phosphoric acid | 0.0124 | 50 | A | clear | 82 | 3930 | 1.9 |
| Example 2-5 | 100 | 200 | 100 | concentrated sulfuric acid | 0.0146 | 50 | A | clear | 82 | 4050 | 1.9 |

It was apparent from the results of Examples 2-1 to 2-3 in Table 5 that when the temperature of mixed solution at the time of layer separation is in the range specified by the present invention, the separating property is enhanced, and the yield of the obtained PTMG is very high. In addition, the results showed the effect that when an inorganic acid such as phosphoric acid or concentrated sulfuric acid is further added in the mixing step, the transparency of each layer at the time of layer separation is enhanced and the number average molecular weight of the obtained PTMG is increased.

Thus, it was revealed that by the production method of the present invention, a polyether polyol having a higher molecular weight can be produced with high productivity, compared with conventionally known methods.

Test Example 3

The measurements and evaluations in Test Example 3 are the same as those in Test Example 2.

Example 3-1

A methanol solution of PTMG was prepared by adding 500 g of methanol to 250 g of PTMG (trade name: "PTMG #3000", produced by Mitsubishi Chemical Corporation, number average molecular weight: 2,750, Mw/Mn: 2.44). The methanol solution of PTMG was added to a vessel (a 1,000 mL separable flask with a jacket). Subsequently, 250 g of desalted water having added thereto 0.0309 g of an aqueous 85 wt % phosphoric acid solution was added to the vessel, and the solution was mixed by stirring at a jacket temperature of 50° C. for 1 hour.

The solution was then left standing for 1 hour while keeping the jacket temperature at 50° C. The mixed solution after standing was separated into two layers of upper layer and lower layer, and both the upper layer and the lower layer were highly transparent, making it very easy to recognize the interface.

The lower layer (oil layer) was withdrawn into a 500 mL glass vessel from the solution after layer separation. The vessel was set in an oil bath, and bubbling with nitrogen gas was performed to remove methanol and water by distillation for 1 hour under the conditions of normal pressure and a bath temperature of 100° C.

Thereafter, the remaining solvent was distilled off by reducing the pressure to 10 mmHg while keeping the bath temperature at 100° C., and PTMG was thereby obtained in a yield of 82.0%. The obtained PTMG was subjected to GPC analysis, and the number average molecular weight and molecular weight distribution were calculated, as a result, the number average molecular weight and Mw/Mn were 3,930 (increased by 1,180 relative to raw material polyether polyol) and 1.90 (decreased by 0.54 relative to raw material polyether polyol), respectively.

Example 3-2

A polyether polyol was produced by the same method as in Example 3-1 except for adding 0.0031 g of an aqueous 85 wt % phosphoric acid solution. The mixed solution after standing was separated into two layers of upper layer and lower layer, and both the upper layer and the lower layer were transparent. The yield was 81.0%, and in the obtained PTMG, the number average molecular weight and Mw/Mn were 4,010 (increased by 1,260 relative to raw material polyether polyol) and 1.89 (decreased by 0.55 relative to raw material polyether polyol), respectively.

Example 3-3

A polyether polyol was produced by the same method as in Example 3-1 except for adding 0.0365 g of concentrated sulfuric acid in place of an aqueous 85 wt % phosphoric acid solution. The mixed solution after standing was separated into two layers of upper layer and lower layer, and both the upper layer and the lower layer were transparent. The yield was 82.0%, and in the obtained PTMG, the number average molecular weight and Mw/Mn were 4,050 (increased by 1,300 relative to raw material polyether polyol) and 1.89 (decreased by 0.55 relative to raw material polyether polyol), respectively.

Comparative Example 3-1

A polyether polyol was produced by the same method as in Example 3-1 except for not adding an aqueous 85 wt % phosphoric acid solution. The mixed solution after standing was separated into two layers of upper layer and lower layer, and the lower layer was slightly clouded. The yield was 83.2% and in the obtained PTMG, the number average molecular weight and Mw/Mn were 3,700 (increased by 950 relative to raw material polyether polyol) and 2.00 (decreased by 0.44 relative to raw material polyether polyol), respectively.

Subsequently, 5.6 g of diatomaceous earth (name of product: Radiolite, produced by Showa Chemical Industry Co., Ltd.) was added to the reaction solution above, and pressure filtration was conducted at a filtration pressure of 0.2 MPa by means of an SUS-made pressure filtration device (using a PTFE-made membrane filter having an opening size of 0.5 µm).

TABLE 6

| | Composition of Reaction Solution (parts by weight) | | | | | Evaluation Results | | | |
| | | | | Other Components | | Transparency | | Number Average | Molecular |
| | PTMG | Methanol | Water | Kind | Addition amount | Separating Property | of Lower Layer | Yield (%) | Molecular Weight | Weight Distribution |
|---|---|---|---|---|---|---|---|---|---|---|
| Example 3-1 | 100 | 200 | 100 | 85 wt % phosphoric acid | 0.0124 | A | clear | 82 | 3930 | 1.90 |
| Example 3-2 | 100 | 200 | 100 | phosphoric acid | 0.0012 | A | clear | 81 | 4010 | 1.89 |
| Example 3-3 | 100 | 200 | 100 | concentrated sulfuric acid | 0.0146 | A | clear | 82 | 4050 | 1.89 |
| Comparative Example 3-1 | 100 | 200 | 100 | — | — | A | cloudy | 83 | 3700 | 2.00 |

It was apparent from the results of Examples 3-1 to 3-3 in Table 6 that when a mixed solution having added thereto phosphoric acid or concentrated sulfuric acid is used, PTMG having a high number average molecular weight and a narrow molecular weight distribution can be produced.

In addition, it was revealed that by using a mixed solution having added thereto phosphoric acid or concentrated sulfuric acid, the transparency of each layer is enhanced and the interface is more easily recognizable.

Thus, it was verified that by the production method of the present invention, a polyether polyol having a higher molecular weight can be produced with high productivity, compared with conventionally known methods.

Test Example 4

The measurements and evaluations in Test Example 4 are the same as those in Test Example 1.

Example 4-1

<Production of Polytetramethylene Ether Glycol 6>

A polymerization reactor (a 500 mL separable flask with a jacket) was added with 600 g of THF, further added with 14.4 g of fluorosulfuric acid as a ring-opening polymerization reaction catalyst, and heated at 45° C. for 5 hours to perform a ring-opening polymerization reaction.

After the completion of ring-opening polymerization reaction, the polymerization reaction solution was put into a Hastelloy-made hydrolysis tank charged with 630 g of desalted water and allowed to undergo hydrolysis at 90° C. for 2 hours, and the remaining oil phase was neutralized by adding 6 g of hydrated lime and 18 g of desalted water.

In order to separate unreacted THF from the reaction solution, simple distillation was performed for 20 minutes under the conditions of normal pressure and a temperature of 140° C. Thereafter, 480 g of toluene was added to the remaining reaction solution, and simple distillation was performed for 20 minutes under the conditions of normal pressure and a temperature of 150° C. to effect dehydration.

Simple distillation of the finally obtained clear filtrate was performed for 1 hour under the conditions of a pressure of 3 mmHg and a temperature of 140° C. to remove toluene and obtain 312.5 g (yield: 52.1%) of Polytetramethylene Ether Glycol 6. The molecular weight was calculated from the hydroxyl value of the obtained Polytetramethylene Ether Glycol 6, as a result, the number average molecular weight and the molecular weight distribution were 3,951 and 2.58, respectively.

<Polymerization of Polyurethane>

To a 1 L-volume flask, 100.1 g of Polytetramethylene Glycol 6 (number average molecular weight: 3,951, molecular weight distribution: 2.58) previously heated at 40° C., and 11.85 g of 4,4'-diphenylmethane diisocyanate (hereinafter, sometimes simply referred to as "MDI") previously heated at 40° C. such that the reaction equivalent ratio of isocyanate group/hydroxyl group (hereinafter, sometimes simply referred to as "NCO/OH ratio") becomes 1.80, were added.

The flask was set in an oil bath at 45° C., and under stirring with an anchor-type stirring blade in nitrogen atmosphere, the temperature of the oil bath was raised to 70° C. over 1 hour and thereafter kept at 70° C. for 3 hours.

The reaction rate of NCO was confirmed by reacting the remaining NCO group with an excessive amount of dibutylamine and back-titrating the remaining dibutylamine with hydrochloric acid, and the reaction rate after 5.5 hours was confirmed to be 96.5%. The oil bath was then removed, and 167.85 g of N,N-dimethylacetamide (hereinafter, sometimes simply referred to as "DMAc", produced by Kanto Chemical Co., Inc.) was added to the flask to afford a polymer concentration of 40 mass % and dissolved by stirring at room temperature to prepare a polyurethane prepolymer solution.

Subsequently, 214.2 g of the polyurethane prepolymer solution above was cooled and held at 10° C., and on the other hand, as the chain extender, 0.85 g of ethylenediamine (hereinafter, sometimes simply referred to as "EDA") and 0.26 g of diethylamine (hereinafter, sometimes simply referred to as "DEA") were dissolved in 104.6 g of DMAc. To this DMAc solution, the polyurethane prepolymer solution cooled and held at 10° C. was added under stirring at high speed. After the addition, while keeping stirring, a mixed solution of 0.13 g of DEA and 114.04 g of DMAc was further added to perform an end-capping reaction and thereby obtain a polyurethane urea DMAc solution having a polymer concentration of 20 mass %.

In the obtained polyurethane, the weight average molecular weight was 167,000 and the amount of hard segment was 5.3 mass %.

Comparative Example 4-1

A polyurethane urea DMAc solution having a polymer concentration of 20 mass % was obtained by performing the same operation as in Example 4-1 except for using Polytetramethylene Ether Glycol 7 (polytetramethylene ether glycol 1800, produced by Mitsubishi Chemical Corporation, number average molecular weight: 1,807, molecular weight distribution: 2.28) and changing the charge amount as shown in Table 7. The reaction completing time of prepolymer polymerization was 3.0 hours, and the NCO reaction rate was 99.7%.

In the obtained polyurethane, the weight average molecular weight was 132,000, and the amount of hard segment was 10.4 mass %.

Comparative Example 4-2

A polyurethane urea DMAc solution having a polymer concentration of 20 mass % was obtained by performing the same operation as in Example 4-1 except for using Polytetramethylene Ether Glycol 8 (polytetramethylene ether glycol 3000, produced by Mitsubishi Chemical Corporation, number average molecular weight: 2,885, molecular weight distribution: 2.60) and changing the charge amount as shown in Table 7. The reaction completion time of prepolymer polymerization was 5.0 hours, and the NCO reaction rate was 96.8%.

In the obtained polyurethane, the weight average molecular weight was 158,000, and the amount of hard segment was 7.1 mass %.

Comparative Example 4-3

<Production of Polytetramethylene Ether Glycol 9>

A polymerization reactor (a 500 mL separable flask with a jacket) was added with 600 g of THF, further added with 16.2 g of fluorosulfuric acid as a ring-opening polymerization reaction catalyst, and heated at 35° C. for 5 hours to perform a ring-opening polymerization reaction.

After the completion of ring-opening polymerization reaction, the polymerization reaction solution was put into a Hastelloy-made hydrolysis tank having charged therein 630 g of desalted water, and allowed to undergo hydrolysis at 95° C. for 2 hours. The remaining oil phase was neutralized by adding 6 g of hydrated lime and 18 g of desalted water.

In order to separate unreacted THF from the reaction solution, simple distillation was performed for 20 minutes under the conditions of normal pressure and a temperature of 140° C. Thereafter, 480 g of toluene was added to the remaining reaction solution, and simple distillation was performed for 20 minutes under the conditions of normal pressure and a temperature of 150° C. to effect dehydration.

Subsequently, 5.6 g of diatomaceous earth (name of product: Radiolite, produced by Showa Chemical Industry Co., Ltd.) was added as a filter aid to the reaction solution above, and pressure filtration was conducted at a filtration pressure of 0.2 MPa by means of an SUS-made pressure filtration device (using a PTFE-made membrane filter having an opening size of 0.5 μm).

Simple distillation of the finally obtained clear filtrate was performed for 1 hour under the conditions of a pressure of 3 mmHg and a temperature of 140° C. to remove toluene and obtain 345.9 g (yield: 57.7%) of polytetramethylene ether glycol. The molecular weight of the obtained polytetramethylene ether glycol was calculated from the hydroxyl value, as a result, the number average molecular weight and the molecular weight distribution 4,913 and 2.70, respectively.

The polytetramethylene ether glycol obtained above (number average molecular weight: 4,913, molecular weight distribution: 2.70) and a polytetramethylene ether glycol having a molecular weight of 1,000 (polytetramethylene ether glycol 1000, produced by Mitsubishi Chemical Corporation) were mixed in a weight ratio of 94.2:5.8 to produce Polytetramethylene Ether Glycol 9 (number average molecular weight: 4,267, molecular weight distribution: 3.06).

<Polymerization of Polyurethane Urea>

The same operation as in Example 4-1 was performed except for using Polytetramethylene Ether Glycol 9 (number average molecular weight: 4,267, molecular weight distribution: 3.06) and changing the charge amount as shown in Table 7. In the prepolymer polymerization, even after a reaction time of 6.0 hours, the NCO reaction rate stayed at 90.1% and did not meet the target of 95.0% or more, and the polymerization was therefore stopped.

The raw-material charging conditions at the time of polyurethane production and the physical properties of the obtained polyurethane in Example 4-1 and Comparative Examples 4-1 to 4-3 are shown in Table 7 below, and the reaction rate of isocyanate group/hydroxyl group and the reaction time are shown in Table 8 below.

TABLE 7

|  |  | Example | Comparative Example | | |
|---|---|---|---|---|---|
|  |  | 4-1 | 4-1 | 4-2 | 4-3 |
| Polyurethane prepolymer production step | Polytetramethylene glycol, number average molecular weight | 3951 | 1807 | 2885 | 4267 |
|  | Polytetramethylene glycol, molecular weight distribution | 3 | 2 | 3 | 3 |
|  | Polytetramethylene Glycol 6 (g) | 100.1 | — | — | — |
|  | Polytetramethylene Glycol 7 (g) | — | 100.6 | — | — |

TABLE 7-continued

|  |  | Example 4-1 | Comparative Example 4-1 | Comparative Example 4-2 | Comparative Example 4-3 |
|---|---|---|---|---|---|
|  | Polytetramethylene Glycol 8 (g) | — | — | 100.5 | — |
|  | Polytetramethylene Glycol 9 (g) | — | — | — | 101.6 |
|  | MDI (g) | 11.9 | 25.1 | 16.0 | 12 |
| Polyurethane prepolymer solution production step | DMAc (g) | 167.9 | 188.6 | 174.7 | — |
| Chain extension step | Prepolymer solution (g) | 214.2 | 262.2 | 251.1 | — |
|  | EDA (g) | 0.85 | 1.96 | 1.03 | — |
|  | EDA (g) | 0.26 | 0.55 | 0.39 | — |
|  | DMAc (g) | 104.6 | 240.5 | 137.0 | — |
| End-capping step | DEA (g) | 0.13 | 0.25 | 0.14 | — |
|  | DMAc (g) | 114.0 | 35.2 | 122.3 | — |

TABLE 8

|  |  | Example 4-1 | Comparative Example 4-1 | Comparative Example 4-2 | Comparative Example 4-3 |
|---|---|---|---|---|---|
| NCO Reaction rate (%) | 2.5 Hr | 80.0 | 100.6 | — | 68.6 |
|  | 3.0 Hr | — | 99.7 | 93.6 | — |
|  | 3.5 Hr | 89.3 | — | — | 81.6 |
|  | 4.0 Hr | — | — | 95.7 | — |
|  | 4.5 Hr | 94.0 | — | — | — |
|  | 5.0 Hr | — | — | 96.8 | 85.2 |
|  | 5.5 Hr | 96.5 | — | — | — |
|  | 6.0 Hr | — | — | — | 90.1 |
| Reaction completing time | Hr | 5.5 | 3.0 | 5.0 | discontinuation of reaction |

It is seen from the results of Example 4-1 and Comparative Example 4-3 in Table 8 that despite the same molecular weight of polytetramethylene ether glycol, if the molecular weight distribution is more than 3.0, the reaction rate is 90.1% even after performing the prepolymer reaction for 6 hours or more and does not meet the 95.0% target and the productivity is thus very poor.

[Evaluation Results of Physical Properties of Polyurethane Urea Film]

The polyurethane urea DMAc solution obtained in each of Example 4-1 and Comparative Examples 4-1 and 4-2 was formed into a film and measured for physical properties, and the results are shown in Table 9.

TABLE 9

|  |  | Example 4-1 | Comparative Example 4-1 | Comparative Example 4-2 |
|---|---|---|---|---|
| Tensile properties | Modulus at elongation of 100% (MPa) | 2.5 | 5.5 | 2.6 |
|  | Modulus at elongation of 300% (MPa) | 5.8 | 10.8 | 6.7 |
|  | Breaking strength (MPa) | 60 | 53 | 45 |
|  | Breaking elongation (%) | 860 | 805 | 743 |
|  | H2/H1 | 0.74 | 0.45 | 0.65 |
|  | Residual strain (%) | 9.3 | 22 | 13 |

As seen from Table 9, in the polyurethane of Example 4-1, not only the modulus at 100% and 300% elongation is low compared with Comparative Examples 4-1 and 4-2 and the flexibility is high but also the breaking strength and breaking elongation are large and the durability for stretching is high. Furthermore, it is seen that the value of H2/H1 is close to 1, revealing high elasticity retention rate, and since the value of residual strain is low, elastic recovery is excellent.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2014-235853) filed on Nov. 20, 2014, Japanese Patent Application (Patent Application No. 2015-083504) filed on Apr. 15, 2015, Japanese Patent Application (Patent Application No. 2015-092098) filed on Apr. 28, 2015, and Japanese Patent Application (Patent Application No. 2015-153410) filed on Aug. 3, 2015, the contents of which are incorporated herein by way of reference.

The invention claimed is:

1. A polyether polyol, which is a polytetramethylene ether glycol, wherein:
   repeating units in a main framework of the polytetramethylene ether glycol consist of only 1,4-butanediol units;
   the polytetramethylene ether glycol has a number average molecular weight of 3,500 to 5,500;
   the polytetramethylene ether glycol has a molecular weight distribution of 1.8 to 2.2; and
   a viscosity of the polytetramethylene ether glycol is 5,500 mPa·s or less, as measured at 40° C. by means of an E-type rotary viscometer.

2. A polyester elastomer, comprising, as constituent units:
   the polyether polyol according to claim 1;
   a diol (excluding the polyether polyol); and
   a dicarboxylic acid.

3. A method for producing a polyether polyol, which is a polytetramethylene ether glycol, the method comprising:
   subjecting a mixed solution comprising a raw material polytetramethylene ether glycol having a number average molecular weight of 2,500 or more, water and an alcohol to a layer separation, to obtain a product polytetramethylene ether glycol,
   wherein:
   repeating units in a main framework of the product polytetramethylene ether glycol consist of only 1,4-butanediol units;

the product polytetramethylene ether glycol has a number average molecular weight of 3,500 to 5,500, which is 300 or more higher than a number average molecular weight of the raw material polytetramethylene ether glycol;

the product polytetraymethylene ether glycol has a molecular weight distribution of 1.8 to 2.2; and a viscosity of the product polytetramethylene ether glycol is 5,500 mP·s or less, as measured at 40° C. by means of an E-type rotary viscometer.

4. The method for producing a polyether polyol according to claim 3, wherein:
a molecular weight distribution of the raw material polytetraymethylene ether glycol is 2.0 or more; and
a molecular weight distribution of the product polytetraymethylene ether glycol is 0.2 or more lower than the molecular weight distribution of the raw material polytetraymethylene ether glycol.

5. The method for producing a polyether polyol according to claim 3, wherein a mixed solution temperature during the layer separation is 31° C. or more.

6. The method for producing a polyether polyol according to claim 3, wherein at least one member selected from the group consisting of an organic carboxylic acid, an organic sulfonic acid and an inorganic acid is added to the mixed solution before the layer separation.

7. The method for producing a polyether polyol according to claim 6, wherein phosphoric acid or sulfuric acid is added as an inorganic acid to the mixed solution before the layer separation.

8. The method for producing a polyether polyol according to claim 3, wherein the alcohol is an aliphatic alcohol having a carbon number of 1 to 10.

9. A polyurethane, comprising, as constituent units:
a polytetramethylene ether glycol having a number average molecular weight of 3,500 to 5,500, a molecular weight distribution of 1.8 to 2.2, and a viscosity of 5,500 mPa·s or less as measured at 40° C. by means of an E-type rotary viscometer; and
an isocyanate compound,
wherein repeating units in a main framework of the polytetramethylene ether glycol consist of only 1,4-butanediol units.

10. The polyurethane according to claim 9, further comprising:
a chain extender (excluding the isocyanate compound).

11. A fiber, which uses the polyurethane according to claim 9.

12. An artificial or synthetic leather, which uses the polyurethane according to claim 9.

13. A coating agent, which uses the polyurethane according to claim 9.

14. A polyether polyol, which is a polytetramethylene ether glycol, wherein:
repeating units in a main framework of the polytetramethylene ether glycol consist of only 1,4-butanediol units;
the polytetramethylene ether glycol has a number average molecular weight of 3,500 to 5,500;
the polytetramethylene ether glycol has a molecular weight distribution of 1.8 to 3.0; and
a viscosity of the polytetramethylene ether glycol is 5,500 mPa·s or less, as measured at 40° C. by means of an E-type rotary viscometer.

15. A method for producing a polyether polyol, which is a polytetramethylene ether glycol, the method comprising:
subjecting a mixed solution comprising a raw material polytetramethylene ether glycol having a number average molecular weight of 2,500 or more, water and an alcohol to a layer separation, to obtain a product polytetramethylene ether glycol,
wherein:
repeating units in a main framework of the product polytetramethylene ether glycol consist of only 1,4-butanediol units;
the product polytetramethylene ether glycol has a number average molecular weight of 3,500 to 5,500, which is 300 or more higher than a number average molecular weight of the raw material polytetramethylene ether glycol;
the product polytetraymethylene ether glycol has a molecular weight distribution of 1.8 to 3.0; and
a viscosity of the product polytetramethylene ether glycol is 5,500 mPa·s or less, as measured at 40° C. by means of an E-type rotary viscometer.

16. A polyurethane, comprising, as constituent units:
a polytetramethylene ether glycol having a number average molecular weight of 3,000 to 5,500, a molecular weight distribution of 1.8 to 3.0, and a viscosity of 5,500 mPa·s or less, as measured at 40° C. by means of an E-type rotary viscometer; and
an isocyanate compound,
wherein repeating units in a main framework of the polytetramethylene ether glycol consist of only 1,4-butanediol units.

* * * * *